United States Patent
Singleton et al.

(10) Patent No.: US 11,858,612 B2
(45) Date of Patent: Jan. 2, 2024

(54) ROTATING RETRACTABLE STEP SYSTEM

(71) Applicant: The Boeing Company, Chicago, IL (US)

(72) Inventors: Christopher B. Singleton, Lake Stevens, WA (US); Joshua Yu-Hu Lee, Seattle, WA (US); Scott Edward Coburn, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 991 days.

(21) Appl. No.: 16/723,669

(22) Filed: Dec. 20, 2019

(65) Prior Publication Data

US 2020/0122817 A1    Apr. 23, 2020

Related U.S. Application Data

(62) Division of application No. 15/339,138, filed on Oct. 31, 2016, now Pat. No. 10,807,696.

(51) Int. Cl.
| | |
|---|---|
| *B64C 1/24* | (2006.01) |
| *A47B 46/00* | (2006.01) |
| *B64D 11/04* | (2006.01) |
| *E06C 1/00* | (2006.01) |

(52) U.S. Cl.
CPC .............. *B64C 1/24* (2013.01); *A47B 46/00* (2013.01); *B64D 11/04* (2013.01); *E06C 1/005* (2013.01); *A47B 2220/05* (2013.01)

(58) Field of Classification Search
CPC ....... B64C 1/24; A47B 46/00; A47B 2220/05; B64D 11/04; B64D 11/00; E06C 1/005; B60R 3/02
See application file for complete search history.

(56) References Cited

U.S. PATENT DOCUMENTS

| | | |
|---|---|---|
| 2,739,561 A | 3/1956 | Kiekhaefer |
| 3,090,462 A | 5/1963 | Huff et al. |
| 3,517,942 A | 6/1970 | Cuffe et al. |

(Continued)

FOREIGN PATENT DOCUMENTS

| | | | |
|---|---|---|---|
| CA | 2976482 A1 | | 4/2018 |
| CN | 203601076 U | * | 5/2014 |

(Continued)

OTHER PUBLICATIONS

Chinese Office Action and English Translation, dated May 25, 2022, regarding Application No. 2017110352138, 9 pages.

(Continued)

*Primary Examiner* — Jessica L Laux
*Assistant Examiner* — Jacob G Sweeney
(74) *Attorney, Agent, or Firm* — Yee & Associates, P.C.

(57) ABSTRACT

A rotating retractable step system positioned within a cutout of a wall is presented. The rotating retractable step system comprises a foot pedal and a support shaft. The foot pedal is configured to be stowed in a vertical orientation within the cutout of the wall, and to rotate between the vertical orientation and a horizontal orientation. The support shaft is associated with the foot pedal, such that movement of the support shaft extends the foot pedal outwardly away from the cutout, or retracts the foot pedal towards the cutout.

20 Claims, 22 Drawing Sheets

(56) References Cited

U.S. PATENT DOCUMENTS

| | | | |
|---|---|---|---|
| 5,195,609 A * | 3/1993 | Ham | B60R 3/02 |
| | | | 280/166 |
| 5,238,300 A | 8/1993 | Silvon et al. | |
| 5,239,796 A | 8/1993 | Maloney | |
| 5,456,468 A | 10/1995 | Stringfellow et al. | |
| 9,549,618 B1 | 1/2017 | Honarvar | |
| 9,605,146 B2 | 3/2017 | Ueda et al. | |
| 9,650,146 B2 | 5/2017 | Boenning | |
| 10,450,050 B2 | 10/2019 | Singleton et al. | |
| 2007/0151306 A1 | 7/2007 | Gilboe et al. | |
| 2008/0006594 A1 | 1/2008 | Layton | |
| 2011/0272524 A1 | 11/2011 | Gorlich et al. | |
| 2012/0199695 A1 * | 8/2012 | Isherwood | B64D 11/0691 |
| | | | 244/118.6 |
| 2014/0209748 A1 | 7/2014 | Griffiths et al. | |
| 2015/0090528 A1 | 4/2015 | Binegar | |
| 2016/0108669 A1 | 4/2016 | Kinkade | |
| 2016/0288898 A1 * | 10/2016 | Rechert | E06C 1/005 |
| 2017/0226800 A1 | 8/2017 | Barry | |

FOREIGN PATENT DOCUMENTS

| | | | |
|---|---|---|---|
| CN | 203601076 U | | 5/2014 |
| CN | 104245506 A | | 12/2014 |
| CN | 104609343 A | | 5/2015 |
| CN | 105715201 A | | 6/2016 |
| FR | 2217211 A1 | | 9/1974 |
| JP | 2006304910 A | * | 11/2006 |
| JP | 2006304910 A | | 11/2006 |
| WO | WO2016160843 A1 | | 10/2016 |

OTHER PUBLICATIONS

Extended European Search Report, dated Feb. 12, 2018, regarding Application No. 17185820.2, 6 pages.
Canadian Intellectual Property Office Examination Search Report, dated Sep. 9, 2020, regarding Application No. 2976482, 5 pages.
Notice of Allowance, dated Apr. 30, 2020, regarding U.S. Appl. No. 15/339,138, 10 pages.
Second Notice of Allowance, dated Jun. 15, 2020, regarding U.S. Appl. No. 15/339,138, 13 pages.
Office Action, dated Nov. 29, 2018, regarding U.S. Appl. No. 15/339,138, 16 pages.
Final Office Action, dated May 30, 2019, regarding U.S. Appl. No. 15/339,138, 15 pages.
Office Action, dated Oct. 31, 2019, regarding U.S. Appl. No. 15/339,138, 14 pages.

* cited by examiner

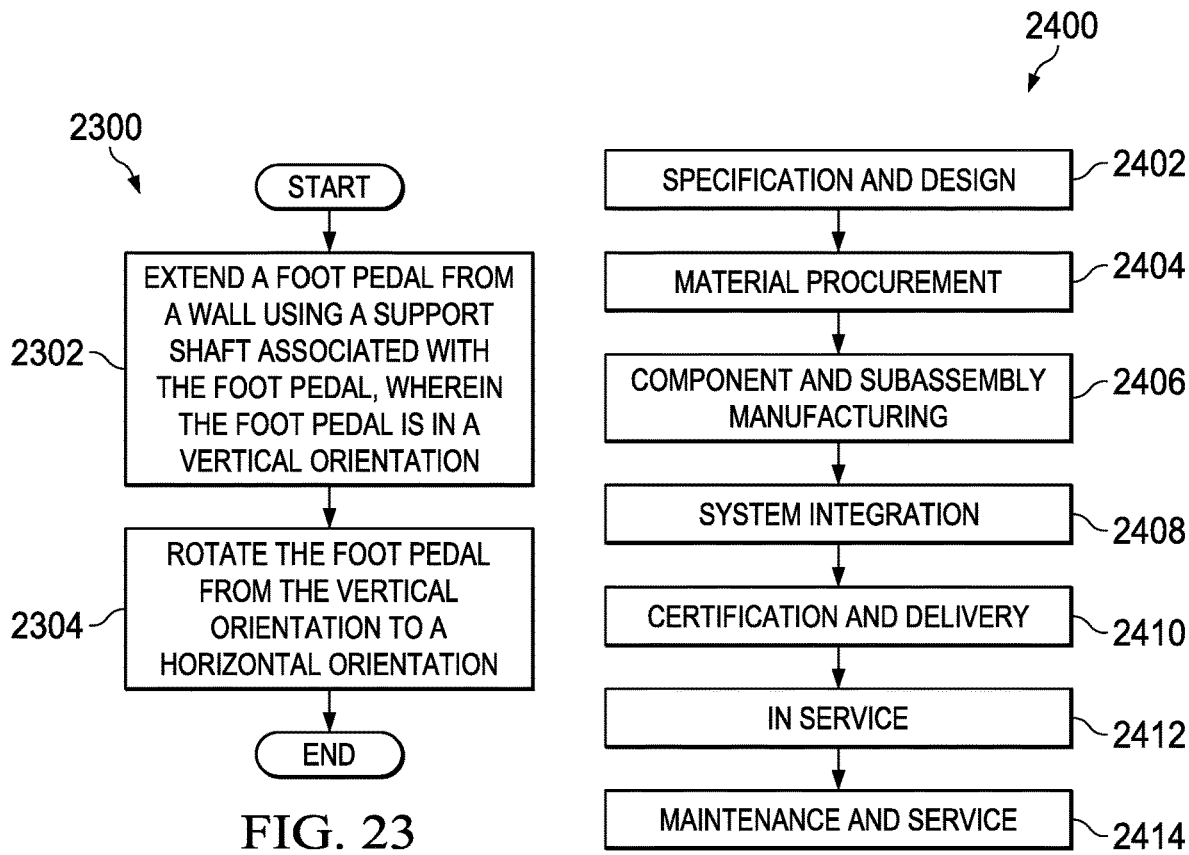
FIG. 23
FIG. 24
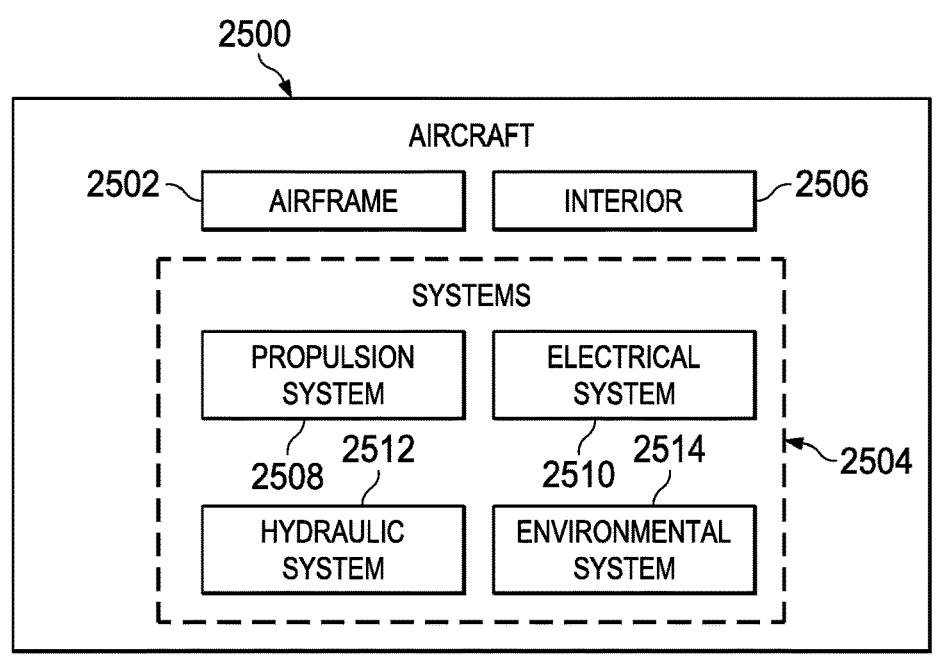
FIG. 25

ROTATING RETRACTABLE STEP SYSTEM

CROSS-REFERENCE TO RELATED APPLICATION

This application is a divisional of and claims the benefit of U.S. patent application Ser. No. 15/339,138 entitled "Rotating Retractable Step System," filed Oct. 31, 2016 and issued as U.S. Pat. No. 10,807,696 on Oct. 20, 2020. Accordingly, U.S. patent application Ser. No. 15/339,138 is incorporated herein by reference in its entirety.

BACKGROUND INFORMATION

1. Field

The present disclosure relates generally to a foot step, and more particularly, to a rotating retractable step system positioned within a cutout.

2. Background

Airlines utilize galleys to stow items for use during flights. Floor space in airplanes is limited. Thus, the majority of galleys in service are designed to have stowage compartments that are located high, and near the cabin ceilings.

These compartments may be difficult for shorter attendants to reach when retrieving or replacing items. Most galley manufacturers have an option to install an elevated foot step, to improve access to these compartments.

However, the conventional foot steps are installed within a galley divider wall so that they are very narrow. This is due to limited space within the galley cart compartment space. These conventional foot steps are typically up to only 5/16 of an inch wide. The conventional foot steps each provide a surface area of approximately 1.6 square inches including a surface area under the ball of the foot of approximately 0.32 square inches.

Due to the size of these conventional footsteps, the footsteps may not be stable to an attendant. The footsteps may be especially difficult to use when wearing shoes or heels. Therefore, it would be desirable to have a method and apparatus that take into account at least some of the issues discussed above, as well as other possible issues.

SUMMARY

In one illustrative embodiment, a rotating retractable step system positioned within a cutout of a wall is presented. The rotating retractable step system comprises a foot pedal and a support shaft. The foot pedal is configured to be stowed in a vertical orientation within the cutout of the wall, and to rotate between the vertical orientation and a horizontal orientation. The support shaft is associated with the foot pedal, such that movement of the support shaft extends the foot pedal outwardly away from the cutout, or retracts the foot pedal towards the cutout.

In another illustrative embodiment, a rotating retractable step system configured to transition between a stowed position and a deployed position is presented. The rotating retractable step system comprises a foot pedal having a step surface, being movable to retract into a stowed position within a cutout in a wall, and movable to extend to a deployed position outside of the cutout, wherein the step surface of the foot pedal is outside of the wall and substantially parallel to the floor when the rotating retractable step system is in the deployed position, and wherein the step surface of the foot pedal is inside of the wall and substantially perpendicular to the floor when the rotating retractable step system is in the stowed position.

In yet another illustrative embodiment, a method is presented. A foot pedal extends outwardly away from a stowed position within a cutout in a wall using a support shaft associated with the foot pedal, wherein the foot pedal is in a vertical orientation. The foot pedal rotates from the vertical orientation to a horizontal orientation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 23 is an illustration of a flowchart of a method for using a rotating retractable step system in accordance with an illustrative embodiment;

FIG. 24 is an illustration of an aircraft manufacturing and service method in the form of a block diagram in accordance with an illustrative embodiment; and FIG. 25 is an illustration of an aircraft in the form of a block diagram in which an illustrative embodiment may be implemented.

DETAILED DESCRIPTION

The different illustrative embodiments recognize and take into account one or more different considerations. For example, the illustrative embodiments recognize and take into account that there may be two desirable conditions for foot steps in an aircraft. First, it is desirable for foot steps to have sufficient space to step on. Second, when closed, it is desirable for the foot steps to not extend out off the surface creating trip hazards.

The illustrative embodiments also recognize and take into account that it may be desirable to increase the surface area of aircraft foot steps from the conventional surface area of 1.6 square inches. The illustrative embodiments further recognize and take into account that it may be desirable to increase the surface area which the ball of the foot can reside from the conventional surface area of 0.3 square inches.

Figure 1:
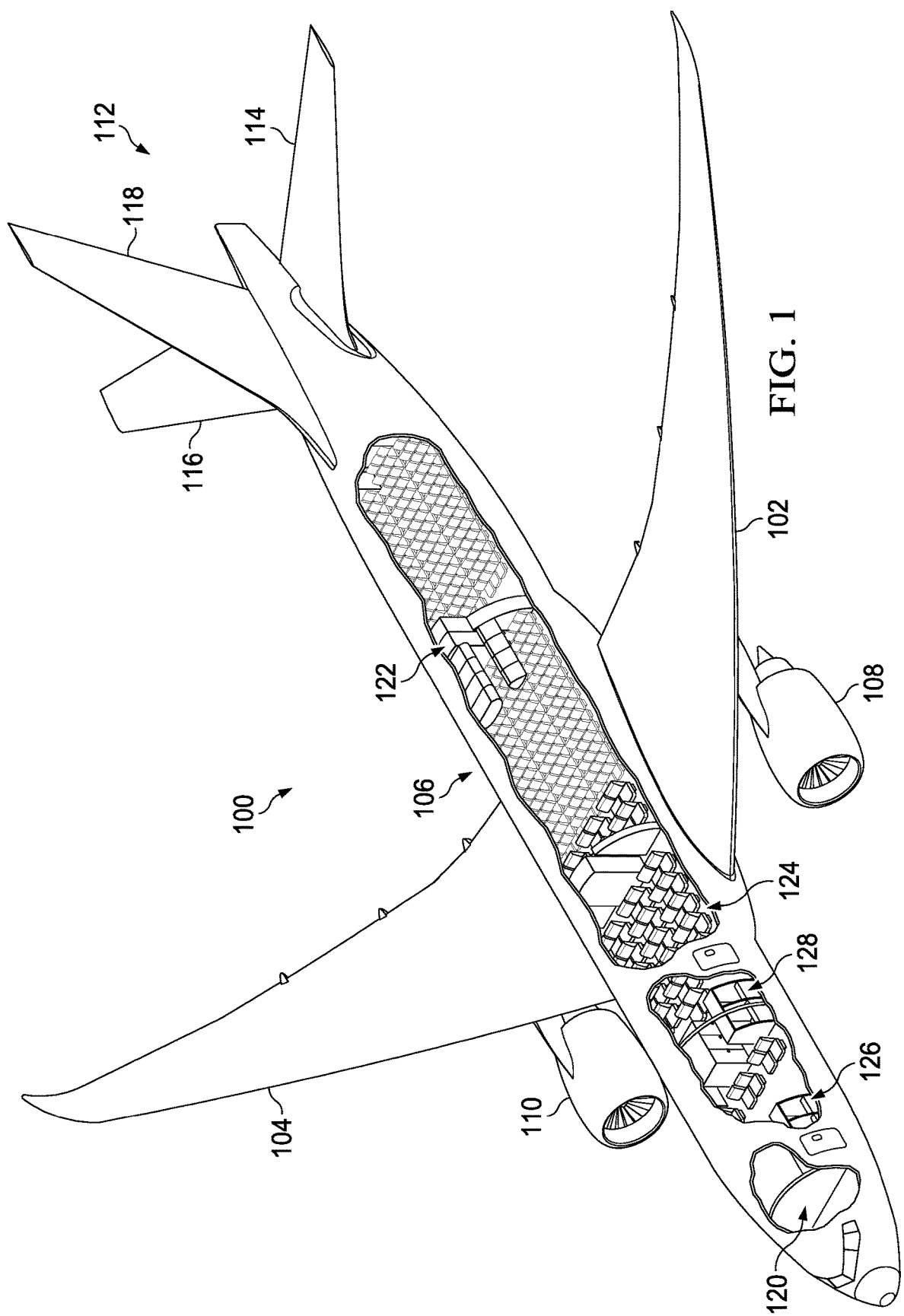
FIG. 1 is an illustration of an aircraft in which an illustrative embodiment may be implemented.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Body 106 also has cockpit 120 and passenger cabin 122. In this example, passenger cabin 122 may include passenger seating in seating area 124. Passenger seating may include a number of aircraft seats. As used herein, a "number of" items means one or more items. For example, a number of aircraft seats means one or more aircraft seats.

Further, seating area 124 in passenger cabin 122 may also include storage areas, such as a number of overhead compartments. Passenger cabin 122 also may include lavatory 126 and galley area 128. These two areas may be partitioned or separated from seating area 124 by a partitioning structure such as, for example, without limitation, a wall.

A rotating retractable step system in accordance with an illustrative embodiment may be used in aircraft 100. For example, a rotating retractable step system in accordance with an illustrative embodiment may be used in at least one of seating area 124 or galley area 128.

As used herein, the phrase "at least one of," when used with a list of items, means different combinations of one or more of the listed items may be used, and only one of each item in the list may be needed. In other words, "at least one of" means any combination of items and number of items may be used from the list but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft.

The different illustrative embodiments may be applied to other types of aircraft, such as private passenger aircraft, a rotorcraft, and other suitable types of aircraft. Also, other areas may be present in addition to seating area 124, lavatory 126, and galley area 128. Other areas may include, for example, without limitation, closets, storage areas, lounges, and other suitable areas for passenger seating. As another example, airplane seats within seating area 124 may be arranged differently from the depicted example. In other illustrative embodiments, some seats may be grouped into sets of single seats instead of three seats or pairs of seats as is illustrated in seating area 124.

Figure 2:
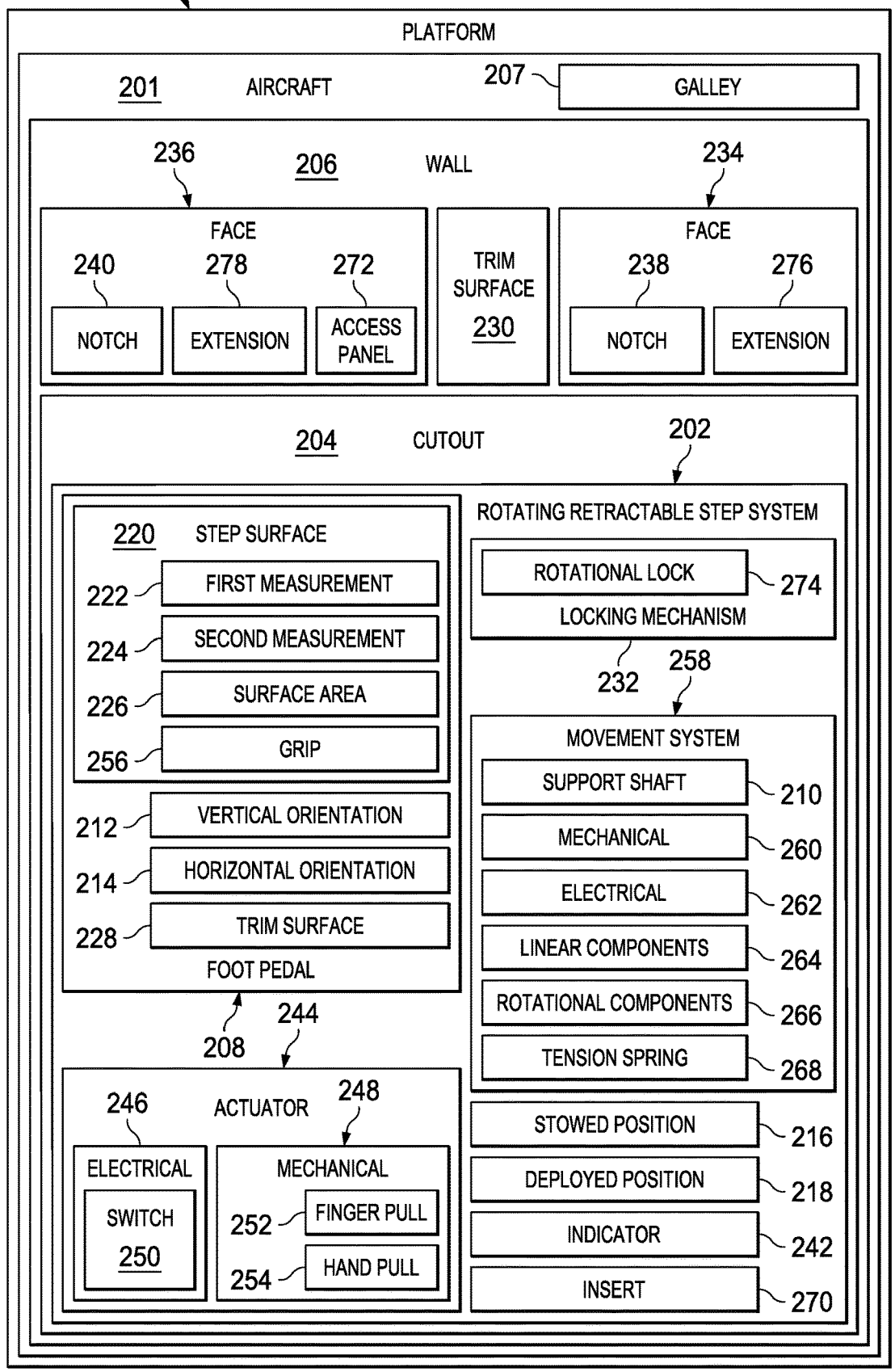
FIG. 2 is an illustration of a block diagram of a platform in accordance with an illustrative embodiment.

With reference now to FIG. 2 an illustration of a block diagram of a platform is depicted in accordance with an illustrative embodiment. Platform 200 may take the form of aircraft 201. Aircraft 100 of FIG. 1 may be a physical implementation of aircraft 201.

Aircraft 100 includes rotating retractable step system 202 positioned within cutout 204 of wall 206. In some illustrative examples, wall 206 may be present in galley 207. For example, wall 206 may be a part of a monument in galley 207 of aircraft 100. Galley area 128 may be a physical implementation of galley 207 of FIG. 2.

Rotating retractable step system 202 comprises foot pedal 208 and support shaft 210. Foot pedal 208 is configured to be stowed in vertical orientation 212 within cutout 204 of wall 206, and to rotate between vertical orientation 212 and horizontal orientation 214. Support shaft 210 is associated with foot pedal 208, such that the movement of support shaft 210 extends foot pedal 208 outwardly away from cutout 204, or retracts foot pedal 208 towards cutout 204.

When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Rotating retractable step system 202 is configured to transition between stowed position 216 and deployed position 218. Foot pedal 208 has step surface 220. Foot pedal 208 is movable to retract into stowed position 216 within cutout 204 in wall 206, and movable to extend to deployed position 218 outside of cutout 204. Step surface 220 of foot pedal 208 is outside of wall 206 and substantially parallel to the floor when rotating retractable step system 202 is in deployed position 218. Step surface 220 of foot pedal 208 is inside of wall 206 and substantially perpendicular to the floor when rotating retractable step system 202 is in stowed position 216.

Step surface 220 has first measurement 222 and second measurement 224. First measurement 222 may be referred to as a length. Second measurement 224 may be referred to as a width. First measurement 222 and second measurement 224 form surface area 226. Surface area 226 is at least 3.5 square inches. Surface area 226 should have sufficient area to step on. Surface area 226 should be small enough that foot pedal 208 does not extend out of wall 206 when in stowed position 216.

In some illustrative examples, first measurement 222 is in the range of one inch to five inches. In some illustrative examples, second measurement 224 is in the range of one inch to five inches.

Step surface 220 may have any desirable texture. In some illustrative examples, step surface 220 may include a non-slip material. In other illustrative examples, step surface 220 may include surface treatments.

Foot pedal 208 also includes trim surface 228. Trim surface 228 and step surface 220 are substantially perpendicular to each other and share a common edge. Trim surface 228 is exposed to interior of aircraft 201 in stowed position 216. Trim surface 228 is substantially in-line with trim surface 230 of wall 206. Trim surface 228 is configured to substantially align with trim surface 230 of wall 206 when rotating retractable step system 202 is in stowed position 216. Trim surface 228 of wall 206 is exposed to the interior of aircraft 201.

Rotating retractable step system 202 further comprises locking mechanism 232 configured to restrict the rotation of foot pedal 208 from horizontal orientation 214 while rotating retractable step system 202 is in deployed position 218. In one illustrative example, locking mechanism 232 is a number of notches in wall 206.

Wall 206 includes parallel faces, face 234 and face 236. The number of notches in wall 206 include notch 238 in face 234 and notch 240 in face 236. When rotating retractable step system 202 is in deployed position 218, a portion of foot pedal 208 is retained within notch 238 in face 234 and notch 240 in face 236.

In some illustrative examples, rotating retractable step system 202 further comprises indicator 242 configured to indicate that rotating retractable step system 202 is in deployed position 218. Indicator 242 may be an audible indicator or a visible indicator. In some illustrative examples, indicator 242 is selected from a light, a color, or an audible signal.

When locking mechanism 232 is a number of notches in wall 206, indicator 242 may be a portion of step surface 220. For example, indicator 242 may be a line, a color, or another visible indicator on step surface 220 that will be covered when foot pedal 208 is retained within notch 238 and notch 240.

When indicator 242 is an audible signal, the audible signal may be a function of locking foot pedal 208 in deployed position 218. For example, a component of rotating retractable step system 202 may make a "click" when rotating retractable step system 202 is in deployed position 218. In some illustrative examples, indicator 242 may generate an indication using two electrical contacts. The indication may be one of lighting a light when the two electrical components are in contact or playing a sound when the two electrical components are in contact.

Rotating retractable step system 202 further comprises actuator 244 configured to receive a user input to initiate movement of support shaft 210. Actuator 244 is at least one of electrical 246 or mechanical 248. When actuator 244 is electrical 246, actuator 244 takes the form of switch 250. Switch 250 is an electrical component that can complete an electrical circuit. Switch 250 may be a button, a pole switch, a toggle switch, or any other desirable type of switch.

When actuator 244 is mechanical 248, actuator 244 may take the form of finger pull 252 or hand pull 254 separate from foot pedal 208 or grip 256 of foot pedal 208. Grip 256 may be one of a finger pull or a hand pull located on step surface 220 of foot pedal 208.

Rotating retractable step system 202 further comprises movement system 258 configured to provide at least one of extension force, retraction force, or rotation force for foot pedal 208. Movement system 258 may be at least one of mechanical 260 or electrical 262. In some illustrative examples, mechanical 260 components of movement system 258 may translate movement of mechanical 248 actuator 244 into movement of foot pedal 208. In other illustrative examples, mechanical 260 components of movement system 258 may move foot pedal 208 in response to receiving input from electrical 246 actuator 244.

Movement system 258 includes linear components 264 and rotational components 266. Linear components 264 facilitate movement of foot pedal 208 into and out of cutout 204. Rotational components 266 facilitate movement of foot pedal 208 between vertical orientation 212 and horizontal orientation 214.

In some illustrative examples, foot pedal 208 is configured to rotate about an axis extending through the support shaft 210. In some illustrative examples, foot pedal 208 is configured to rotate about a centerline extending through foot pedal 208.

In some illustrative examples, a user may provide the force to drive linear components 264 and rotational components 266. For example, a user may pull on mechanical 248 actuator 244 to drive linear components 264. As another example, a user may apply rotational force to foot pedal 208 to drive rotational components 266.

In other illustrative examples, a user may provide the force to drive only one of linear components 264 or rotational components 266. In yet other illustrative examples, the force to drive linear components 264 and rotational components 266 is generated by a motor or other source in response to receiving input at actuator 244.

Movement system 258 also includes tension spring 268. Tension spring 268 is connected to support shaft 210, and configured to retract foot pedal 208. When actuator 244 takes the form of at least one of finger pull 252 or hand pull 254, tension spring 268 may also retract finger pull 252 or hand pull 254. In other examples, an additional tension spring may be present to retract finger pull 252 or hand pull 254 separately from tension spring 268 retracting foot pedal 208.

Rotating retractable step system 202 may be installed in multiple channels in cutout 204 in wall 206. In other illustrative examples, the components of rotating retractable step system 202 may be combined into insert 270 having a housing. Insert 270 may be installed quickly and easily into cutout 204 by sliding insert 270 into place and securing.

In some illustrative examples, access panel 272 is present in face 236 of wall 206. Access panel 272 may provide access to rotating retractable step system 202 for maintenance or part replacement. When rotating retractable step system 202 is insert 270, access panel 272 may instead be a portion of the housing of insert 270. For maintenance or to replace a component, the internal mechanisms of rotating retractable step system 202 could be accessed by removing access panel 272.

The illustration of platform 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, rather than notch 238 and notch 240, locking mechanism 232 may instead be rotational lock 274. When locking mechanism 232 is rotational lock 274, notch 238 and notch 240 may not be present in wall 206.

Further, when locking mechanism 232 is rotational lock 274, extension 276 and extension 278 may be present to provide support to foot pedal 208. Extension 276 and extension 278 may extend from wall 206 to provide support beneath foot pedal 208 to withstand the weight of a user in horizontal orientation 214.

Figure 3:
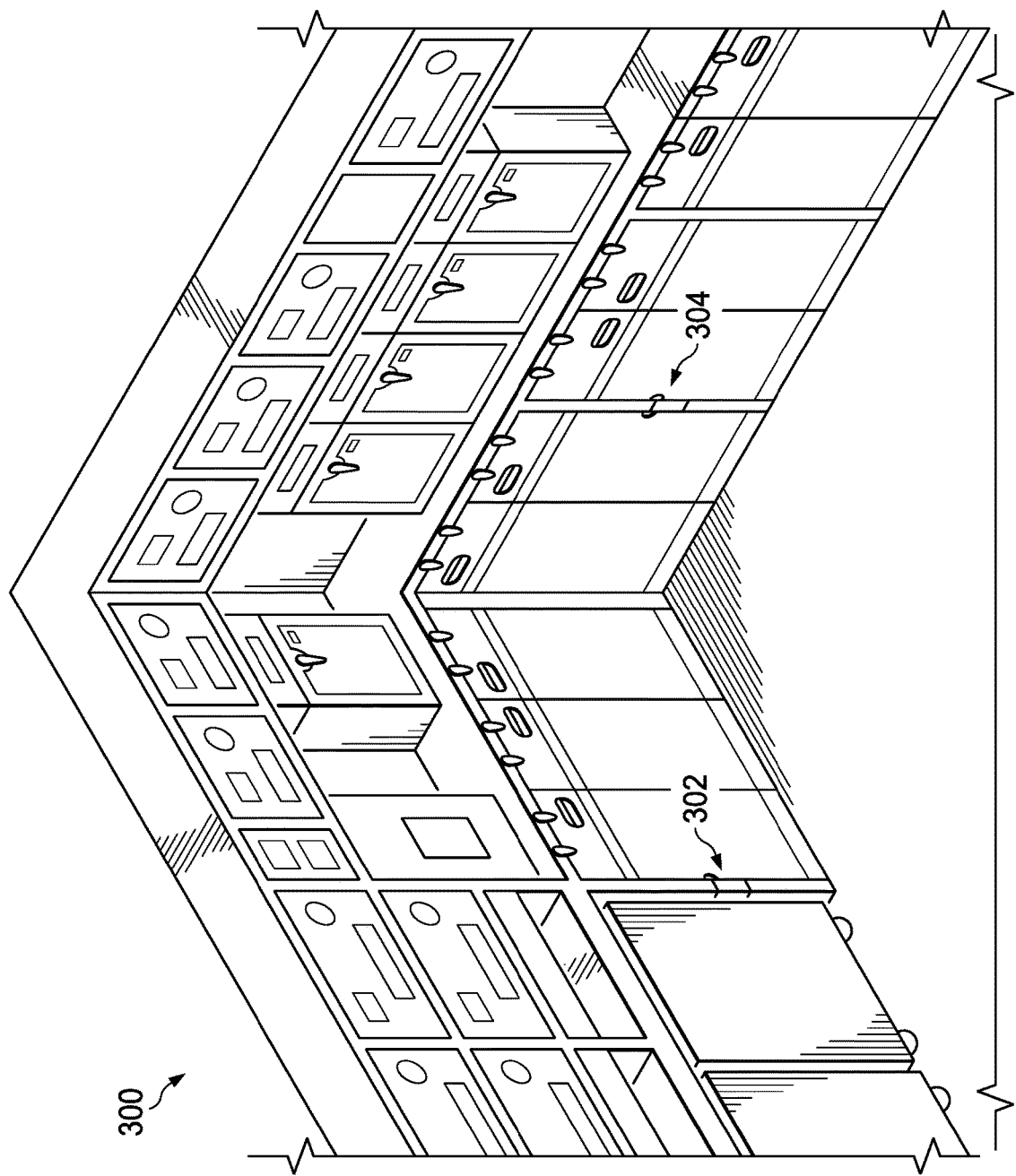
FIG. 3 is an illustration of a galley in which an illustrative embodiment may be implemented.

Turning now to FIG. 3, an illustration of a galley in which an illustrative embodiment may be implemented is depicted. Galley 300 may be a closer view of galley area 128 of FIG. 1. As depicted, galley 300 includes rotating retractable step system 302 and rotating retractable step system 304. As depicted, both rotating retractable step system 302 and rotating retractable step system 304 are in a stowed position.

Figure 4:
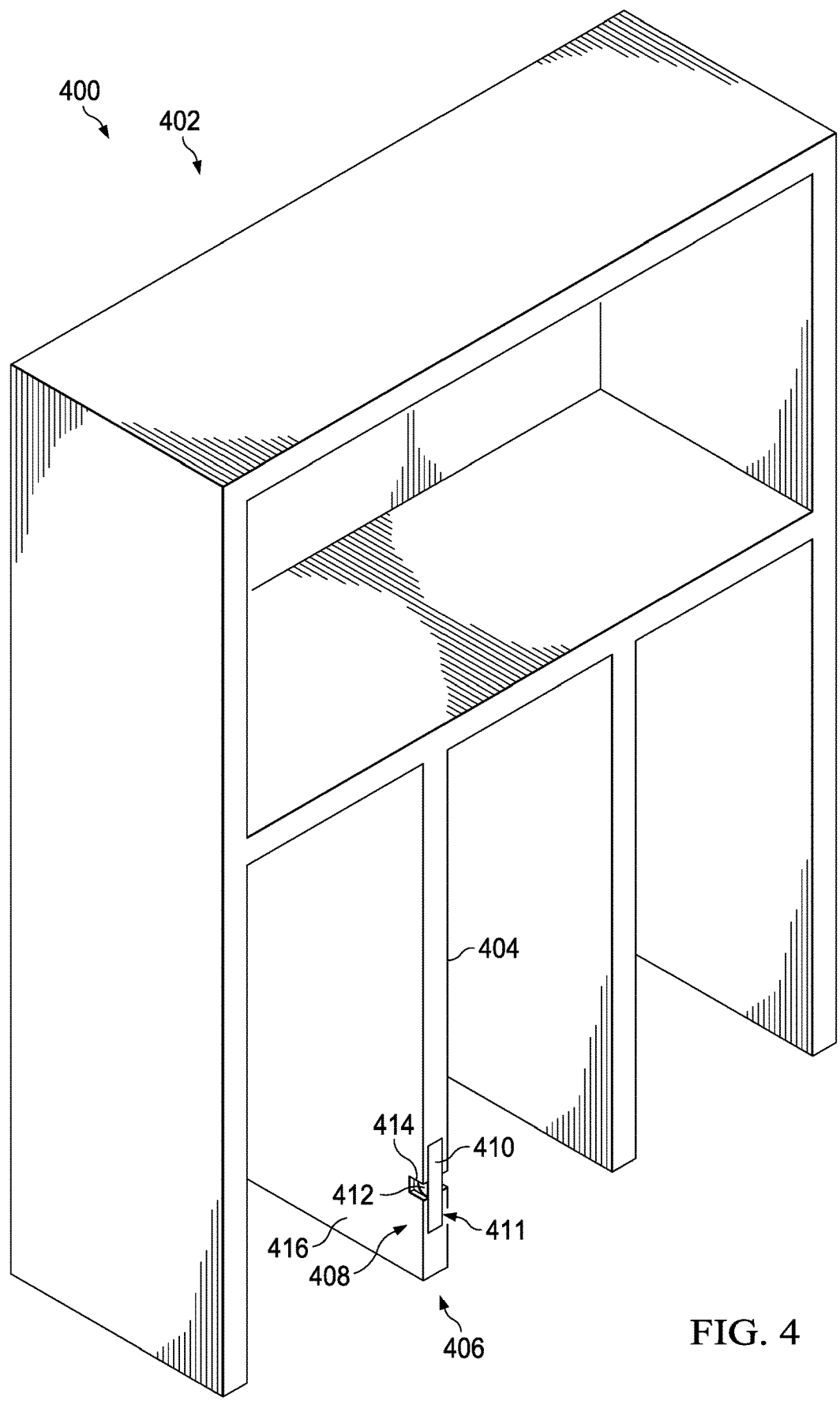
FIG. 4 is an illustration of a structure with a first embodiment of a rotating retractable step system in a stowed position in accordance with an illustrative embodiment.

Turning now to FIG. 4, an illustration of a structure with a first embodiment of a rotating retractable step system in a stowed position is depicted in accordance with an illustrative embodiment. View 400 contains monument 402. Monument 402 is a component of a galley, such as galley 300 of FIG. 3. Monument 402 includes wall 404 containing rotating retractable step system 406. Rotating retractable step system 406 is a physical implementation of rotating retractable step system 202 of FIG. 2.

In view 400, rotating retractable step system 406 is in stowed position 408. In stowed position 408, trim surface 410 of foot pedal 411 of rotating retractable step system 406 is visible. Grip 412 is also visible in stowed position 408. Grip 412 is visible through notch 414 of face 416 of wall 404. In some illustrative examples, grip 412 may be on the step surface (not depicted) of foot pedal 411. In stowed position 408, the remainder of rotating retractable step system 406 is within wall 404.

Foot pedal 411 of rotating retractable step system 406 may be pulled from stowed position 408 by pulling on grip 412. Foot pedal 411 may then be rotated while grasping grip 412. As depicted, grip 412 may be a finger grip. In this illustrative example, grip 412 is an actuator for rotating retractable step system 406.

Figure 5:
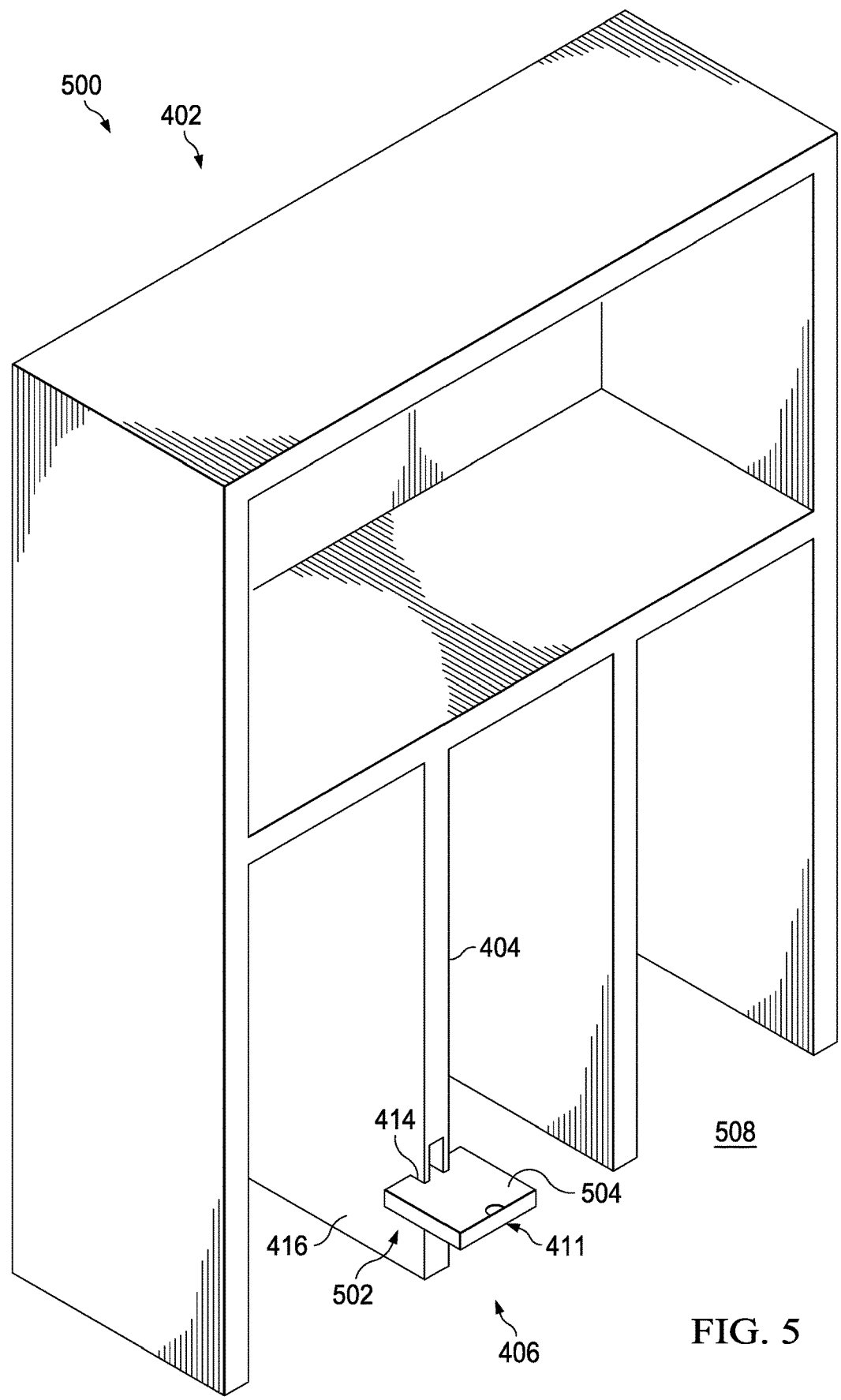
FIG. 5 is an illustration of the structure with the first embodiment of the rotating retractable step system in a deployed position in accordance with an illustrative embodiment.

Turning now to FIG. 5, an illustration of a structure with the first embodiment of the rotating retractable step system in a deployed position is depicted in accordance with an illustrative embodiment. View 500 is a view of rotating retractable step system 406 in deployed position 502. In deployed position 502, step surface 504 of foot pedal 411 is visible. In deployed position 502, step surface 504 of foot pedal 411 is locked against rotation and is ready for a person to use foot pedal 411.

As depicted, step surface 504 is parallel to floor 508. In this illustrative example, step surface 504 of foot pedal 411 is locked against rotation by insertion into notch 414 of face 416 of wall 404 and a second notch on an opposite face of wall 404.

Figure 6:
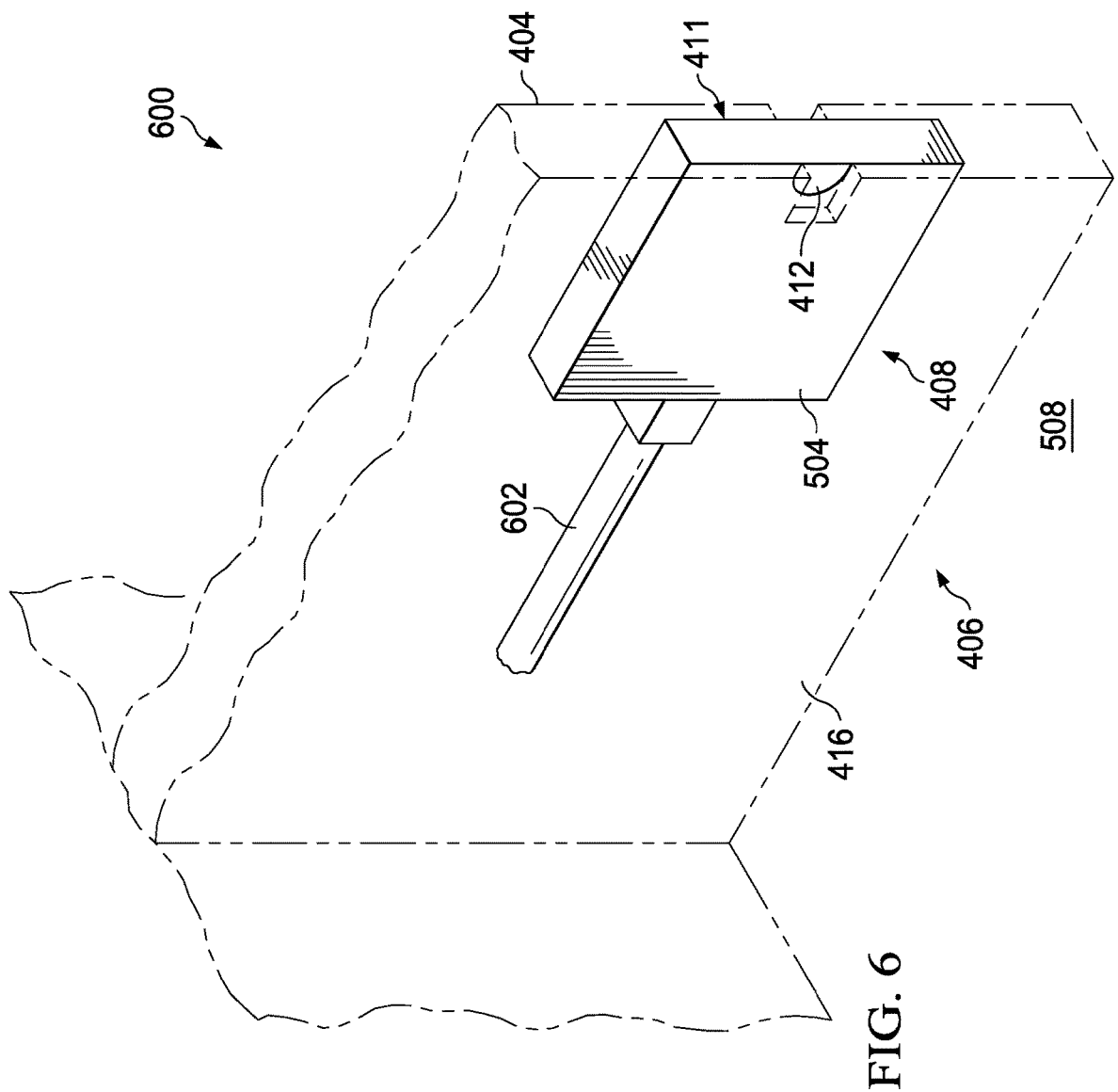
FIG. 6 is an illustration of a rotating retractable step system in a stowed position within a wall in accordance with an illustrative embodiment.

Turning now to FIG. 6, an illustration of a rotating retractable step system in a stowed position within a wall is depicted in accordance with an illustrative embodiment. View 600 is a view of rotating retractable step system 406 within wall 404 of FIG. 4. In view 600, face 416 is transparent so step surface 504 of foot pedal 411 is visible in stowed position 408.

As can be seen in view 600, step surface 504 is parallel to wall 404 in stowed position 408. Step surface 504 is perpendicular to floor 508 in stowed position 408.

In view 600, support shaft 602 is visible. Support shaft 602 is rotatably connected to foot pedal 411. As foot pedal 411 is pulled out of wall 404, tension is applied to support shaft 602.

Figure 7:
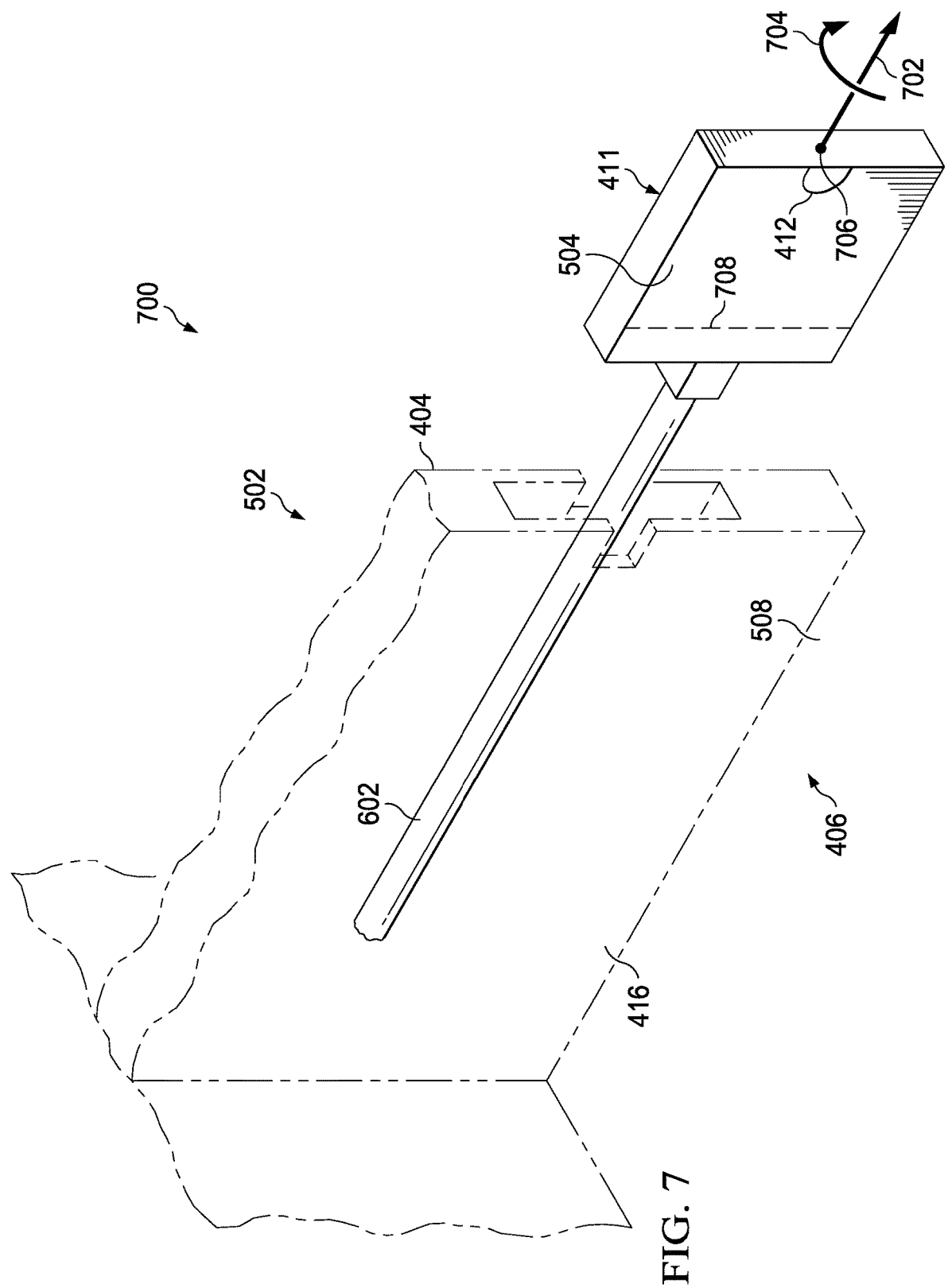
FIG. 7 is an illustration of a rotating retractable step system transitioning between a stowed position and a deployed position in accordance with an illustrative embodiment.

Turning now to FIG. 7, an illustration of a rotating retractable step system transitioning between a stowed position and a deployed position is depicted in accordance with an illustrative embodiment. In view 700, foot pedal 411 has been pulled completely out of wall 404 by grasping grip 412 and pulling in direction 702.

After pulling all of foot pedal 411 from wall 404, foot pedal 411 is rotated in direction 704. Foot pedal 411 is rotated about axis 706 extending through support shaft 602.

As depicted, foot pedal 411 has indicator 708. Indicator 708 is a visible indicator. As depicted, indicator 708 is a boundary. In some other illustrative examples, indicator 708 may be a portion of step surface 504 that has a different color, pattern, or other visible indication from the remainder of step surface 504.

Indicator 708 may be used to identify when foot pedal 411 is restrained from rotation. Indicator 708 may be used to identify when rotating retractable step system 406 is in deployed position 502. For example, all of indicator 708 may be within wall 404 when rotating retractable step system 406 is in deployed position 502.

Figure 8:
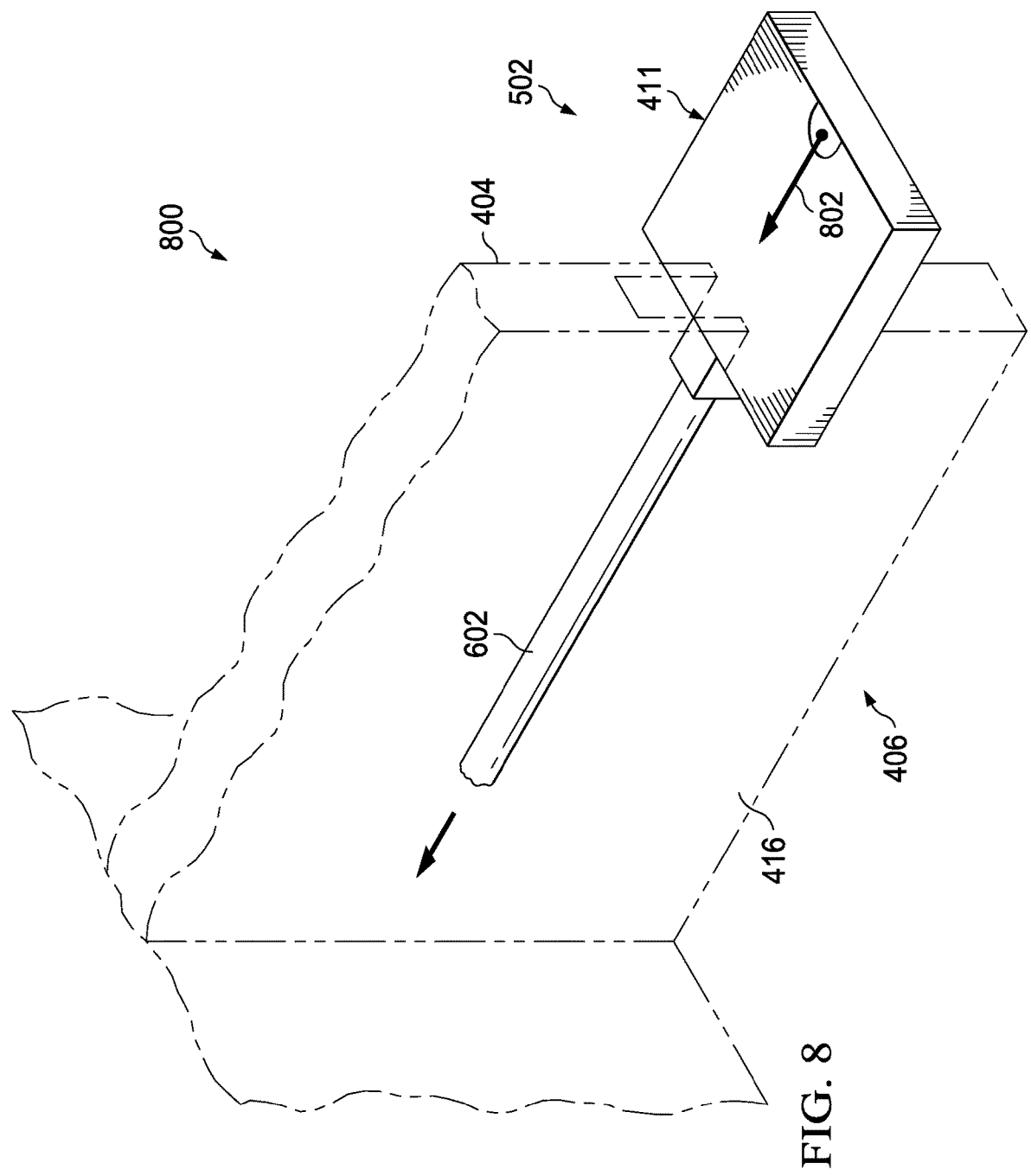
FIG. 8 is an illustration of a rotating retractable step system transitioning between a stowed position and a deployed position in accordance with an illustrative embodiment.

Turning now to FIG. 8, an illustration of a rotating retractable step system transitioning between a stowed position and a deployed position is depicted in accordance with an illustrative embodiment. View 800 is a view of rotating retractable step system 406 moving into deployed position 502 with wall 404 being transparent.

As depicted, foot pedal 411 moves in direction 802 towards wall 404 to place rotating retractable step system 406 into deployed position 502. The tension on support shaft 602 pulls rotating retractable step system 406 into deployed position 502.

Figure 9:
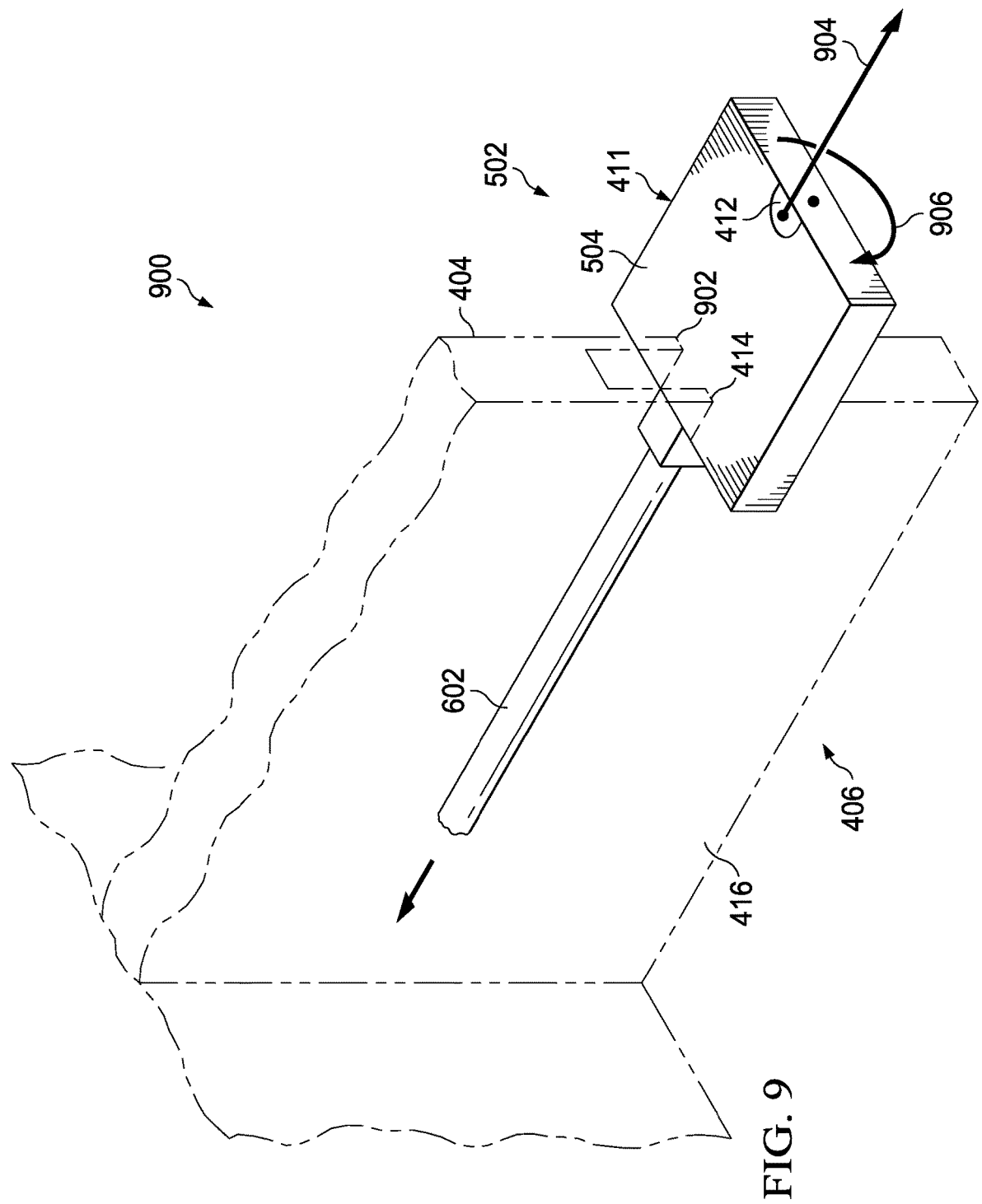
FIG. 9 is an illustration of a rotating retractable step system in a deployed position in accordance with an illustrative embodiment.

Turning now to FIG. 9, an illustration of a rotating retractable step system in a deployed position is depicted in accordance with an illustrative embodiment. View 900 is a view of rotating retractable step system 406 in deployed position 502 with wall 404 being transparent. In deployed position 502, foot pedal 411 is restricted from rotation by notch 414 and notch 902 of wall 404. Tension on support shaft 602 pulls foot pedal 411 into wall 404 and holds foot pedal 411 within notch 414 and notch 902.

To remove foot pedal 411 from deployed position 502, foot pedal 411 is pulled in direction 904 and rotated in direction 906. Foot pedal 411 is pulled by grasping grip 412 on step surface 504.

Figure 10:
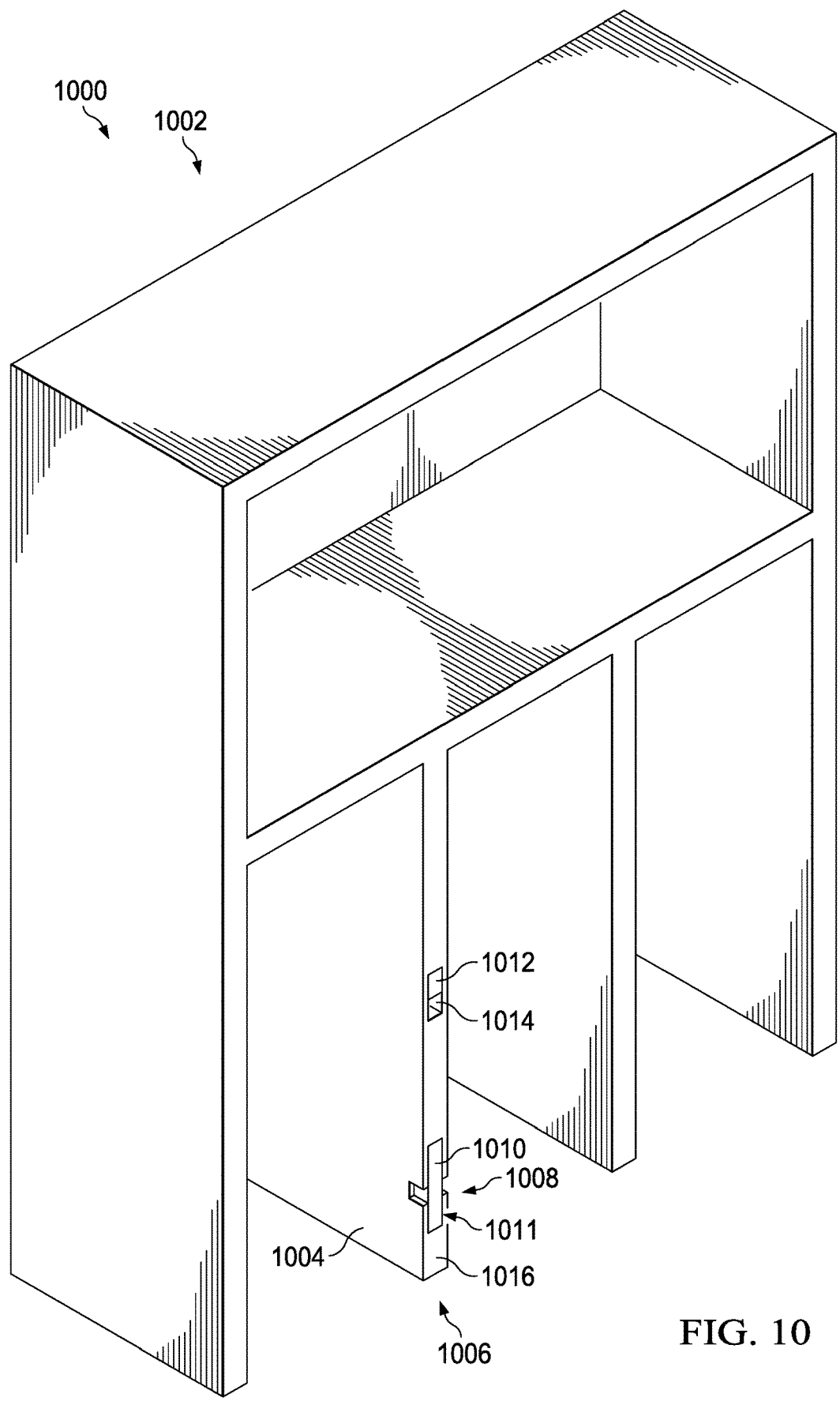
FIG. 10 is an illustration of a structure with a second embodiment of a rotating retractable step system in a stowed position in accordance with an illustrative embodiment.

Turning now to FIG. 10, is an illustration of a structure with a second embodiment of a rotating retractable step system in a stowed position is depicted in accordance with an illustrative embodiment. View 1000 contains monument 1002. Monument 1002 is a component of a galley, such as galley 300 of FIG. 3. Monument 1002 includes wall 1004 containing rotating retractable step system 1006.

Rotating retractable step system 1006 is a physical implementation of rotating retractable step system 202 of FIG. 2. Rotating retractable step system 1006 may be an alternative implementation to rotating retractable step system 406.

In view 1000, rotating retractable step system 1006 is in stowed position 1008. In stowed position 1008, trim surface 1010 of foot pedal 1011 of rotating retractable step system 1006 is visible. Grip 1012 is also visible in stowed position 1008. Grip 1012 is visible through channel 1014 of trim surface 1016 of wall 1004. Grip 1012 is a separate component of rotating retractable step system 1006 from a step surface (not depicted) of foot pedal 1011. Grip 1012 and foot pedal 1011 are operably connected through a series of mechanical or electrical connections. In stowed position 1008, the remainder of rotating retractable step system 1006 is within wall 1004.

Foot pedal 1011 of rotating retractable step system 1006 may be pulled from stowed position 1008 by pulling on grip 1012. Foot pedal 1011 may then be rotated by applying lateral force to foot pedal 1011 while holding grip 1012.

As depicted, grip 1012 may be a finger grip. In this illustrative example, grip 1012 is an actuator for rotating retractable step system 1006.

As a result, foot pedal 1011 is designed to be actuated via a finger grip located above the foot pedal 1011. An attendant would pull grip 1012 out to its maximum length which also pulls foot pedal 1011 out to its maximum length. The maximum length of grip 1012 is based on measurements of foot pedal 1011. In some illustrative examples, the maximum length of grip 1012 may be between 0.5 inches to 3 inches greater than a length of foot pedal 1011. In one illustrative example, the maximum length of grip 1012 is about six inches.

To rotate foot pedal 1011 to a horizontal orientation, the user's foot would apply a rotational force to the edge of foot pedal 1011. In some illustrative examples, the user's foot would apply a clockwise rotational force.

After rotating foot pedal 1011, grip 1012 may be released. Upon releasing grip 1012, grip 1012 returns all the way into wall 1004. Foot pedal 1011 returns to engage the edge profile with notches of wall 1004 and lock into a horizontal position for foot pedal 1011.

To stow rotating retractable step system 1006, an attendant would pull grip 1012 out to its maximum length which also pulls foot pedal 1011 out to its maximum length. When foot pedal 1011 is pulled out to its maximum length, foot pedal 1011 is not locked into the horizontal position.

To rotate foot pedal 1011 to a vertical orientation, the user's foot would apply a rotational force on the edge of foot pedal 1011. In some illustrative examples, the user's foot would apply a counter clockwise rotational force.

After rotating foot pedal 1011, grip 1012 may be released. Upon releasing grip 1012, grip 1012 and foot pedal 1011 return all the way into wall 1004.

Figure 11:
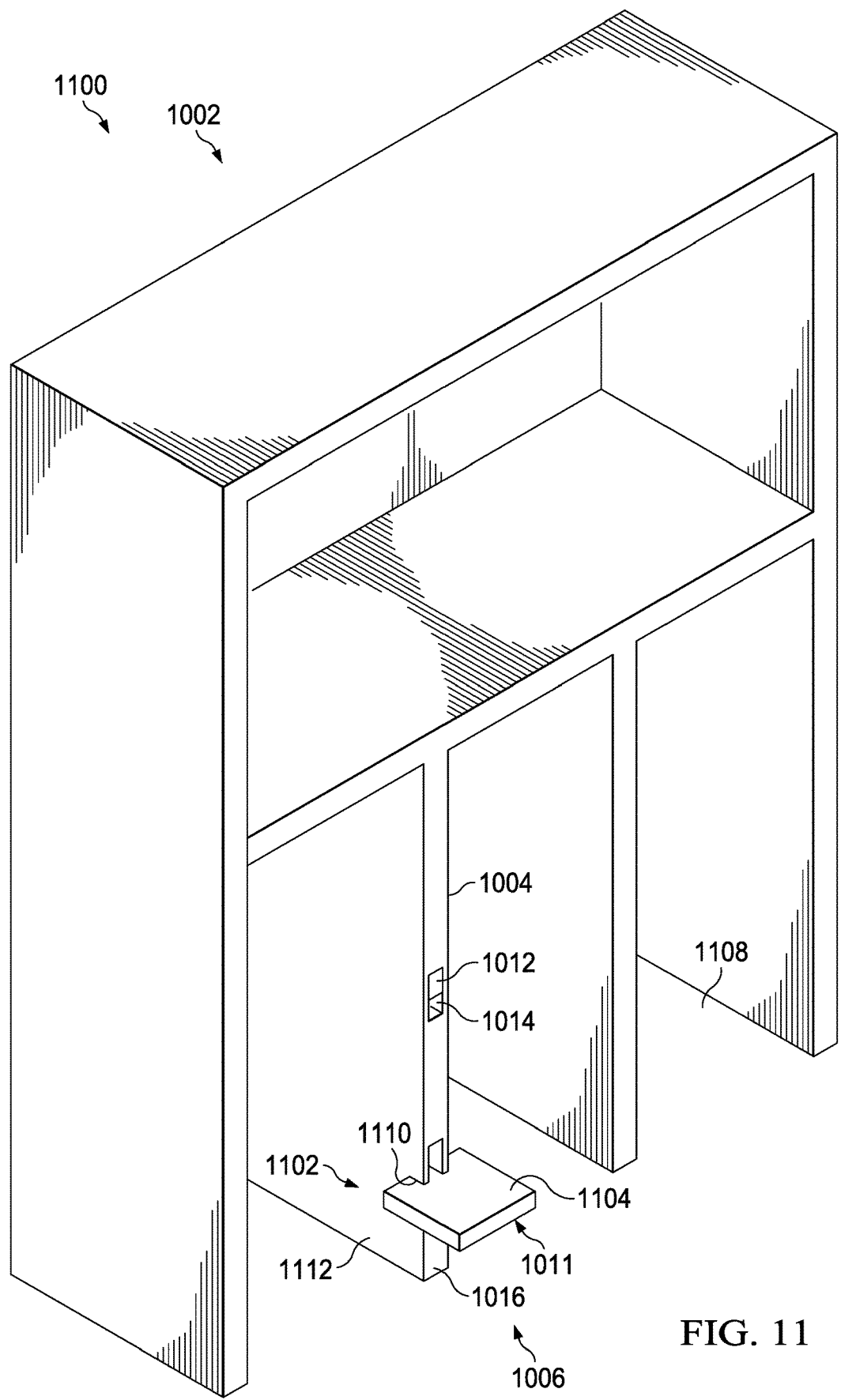
FIG. 11 is an illustration of a structure with a second embodiment of a rotating retractable step system in a deployed position in accordance with an illustrative embodiment.

Turning now to FIG. 11, an illustration of a structure with a second embodiment of a rotating retractable step system in a deployed position is depicted in accordance with an illustrative embodiment. View 1100 is a view of rotating retractable step system 1006 in deployed position 1102. In deployed position 1102, step surface 1104 of foot pedal 1011 is visible. In deployed position 1102, step surface 1104 of foot pedal 1011 is locked against rotation and ready for a person to use foot pedal 1011.

As depicted, step surface 1104 is parallel to floor 1108. In this illustrative example, step surface 1104 of foot pedal 1011 is locked against rotation by insertion into notch 1110 of face 1112 of wall 1004 and a second notch on an opposite face of wall 1004.

In deployed position 1102, grip 1012 is retained within channel 1014 of trim surface 1016 of wall 1004. In deployed position, grip 1012 is in the same or similar position as in view 1000 of FIG. 10.

Figure 12:
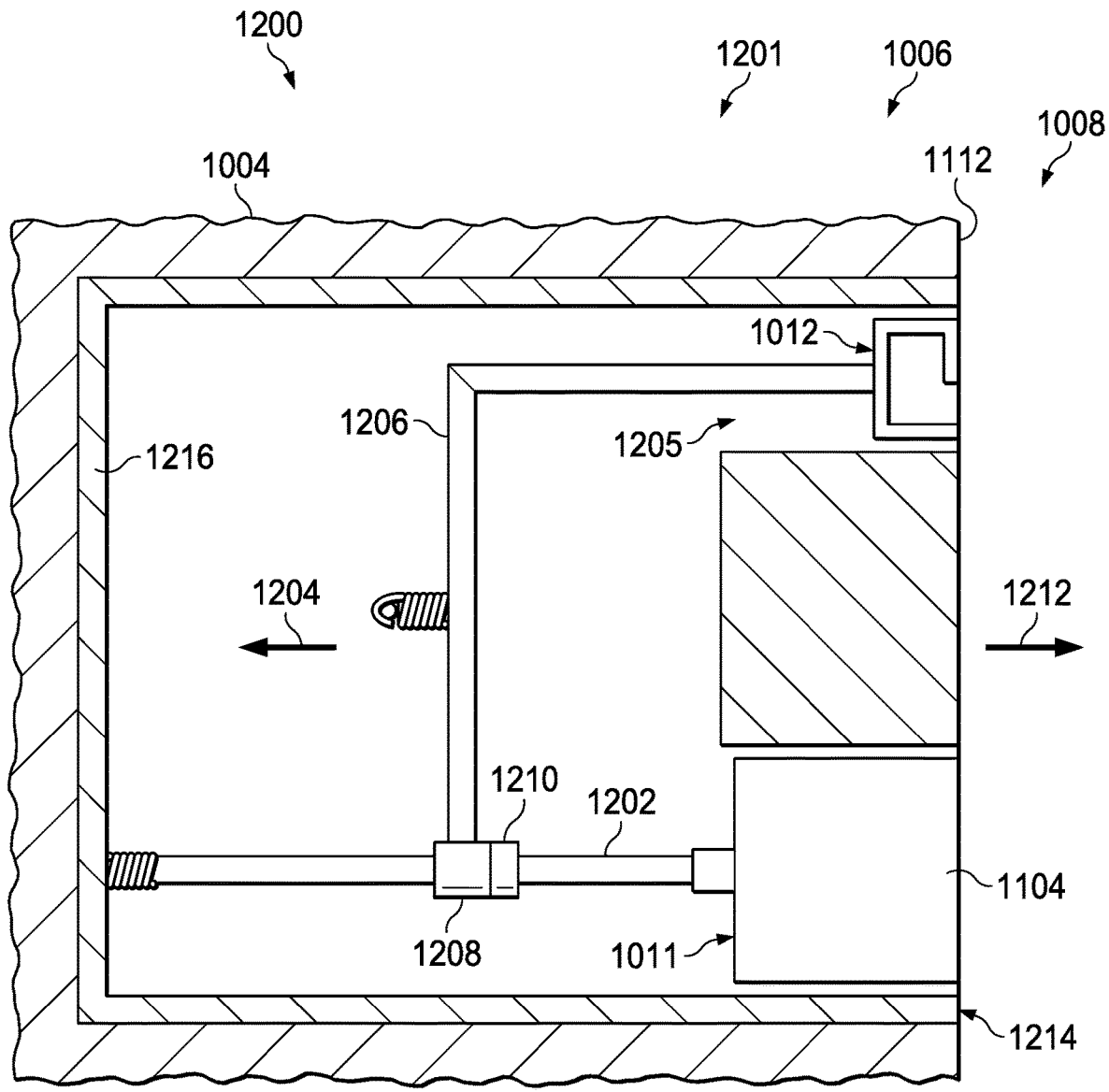
FIG. 12 is an illustration of a rotating retractable step system in a stowed position within a wall in accordance with an illustrative embodiment.

Turning now to FIG. 12, an illustration of a rotating retractable step system in a stowed position within a wall is depicted in accordance with an illustrative embodiment. View 1200 is a view of rotating retractable step system 1006 within wall 1004 of FIG. 10. In view 1200, face 1112 is transparent so step surface 1104 of foot pedal 1011 is visible in stowed position 1008.

As can be seen in view 1200, step surface 1104 is parallel to wall 1004 in stowed position 1008. Step surface 1104 is perpendicular to the floor in stowed position 1008. Movement system 1201 moves foot pedal 1011 relative to wall 1004. Movement system 1201 connects grip 1012 to foot pedal 1011.

In view 1200, support shaft 1202 of movement system 1201 is visible. Support shaft 1202 is rotationally connected to foot pedal 1011. Support shaft 1202 is spring loaded in direction 1204 to apply tension to support shaft 1202. Support shaft 1202 is connected to a spring, such as tension spring 268 of FIG. 2.

Grip 1012 is part of grip assembly 1205. As depicted, grip assembly 1205 also includes linkage bars 1206 and collar 1208. Grip 1012 is connected to linkage bars 1206. Linkage bars 1206 are spring loaded in direction 1204 to apply tension to linkage bars 1206. Linkage bars 1206 are connected to a spring, such as tension spring 268 of FIG. 2.

In some illustrative examples, support shaft 1202 and linkage bars 1206 are connected to separate springs. In other illustrative examples, support shaft 1202 and linkage bars 1206 may be operatively connected to the same spring.

As depicted, collar 1208 engages collar 1210 associated with support shaft 1202. In some illustrative examples, collar 1210 may be referred to as a locking ring. When collar 1208 engages collar 1210, collar 1208 pulls collar 1210 in direction 1212. By collar 1208 pulling collar 1210 in direction 1212, pulling grip 1012 in direction 1212 pulls foot pedal 1011 in direction 1212.

As depicted, rotating retractable step system 1006 is installed in wall 1004 as insert 1214. Insert 1214 includes housing 1216. Insert 1214 may be placed and secured within a cutout in wall 1004 as one component. In some illustrative examples, rotating retractable step system 1006 may not take the form of insert 1214. In these illustrative examples, rotating retractable step system 1006 may be installed into one or more channels in wall 1004 without housing 1216.

As depicted, movement system 1201 comprises support shaft 1202, linkage bars 1206, collar 1208, and collar 1210. As depicted, movement system 1201 is a mechanical system. A mechanical rotational movement system comprises a rotational joint connecting support shaft 1202 and foot pedal 1011.

Although the disclosed components of movement system 1201 are mechanical, other illustrative examples may include electrical, pneumatic, or other types of components. The illustrated components of movement system 1201 are for purposes of illustration and description, and are not intended to be exhaustive or limited to the examples in the form disclosed.

In some illustrative examples, additional components may be present in rotating retractable step system 1006 that are not depicted in FIG. 12. For example, rotating retractable step system 1006 may have guides on at least one of the top or the bottom of a channel housing foot pedal 1011. The guides provide a smooth translation for foot pedal 1011 into and out of wall 1004.

Figure 13:
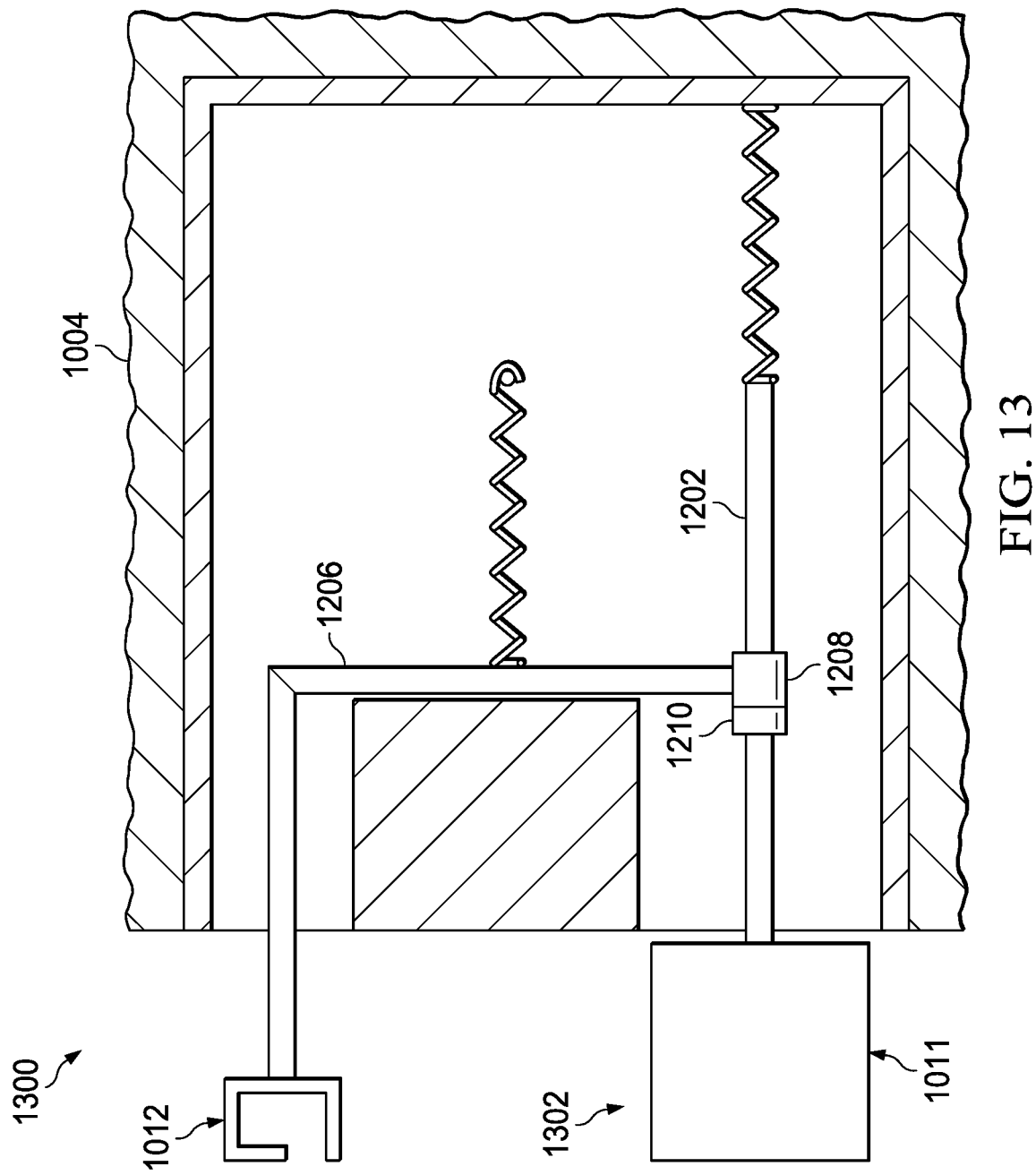
FIG. 13 is an illustration of a rotating retractable step system transitioning between a stowed position and a deployed position in accordance with an illustrative embodiment.

Turning now to FIG. 13, an illustration of a rotating retractable step system transitioning between a stowed position and a deployed position is depicted in accordance with an illustrative embodiment. In view 1300, grip 1012 has been pulled out to its maximum position. The linkage of grip 1012 through contact of collar 1208 and collar 1210 pulls foot pedal 1011 out to its maximum position. In view 1300, foot pedal 1011 is in vertical position 1302.

Figure 14:
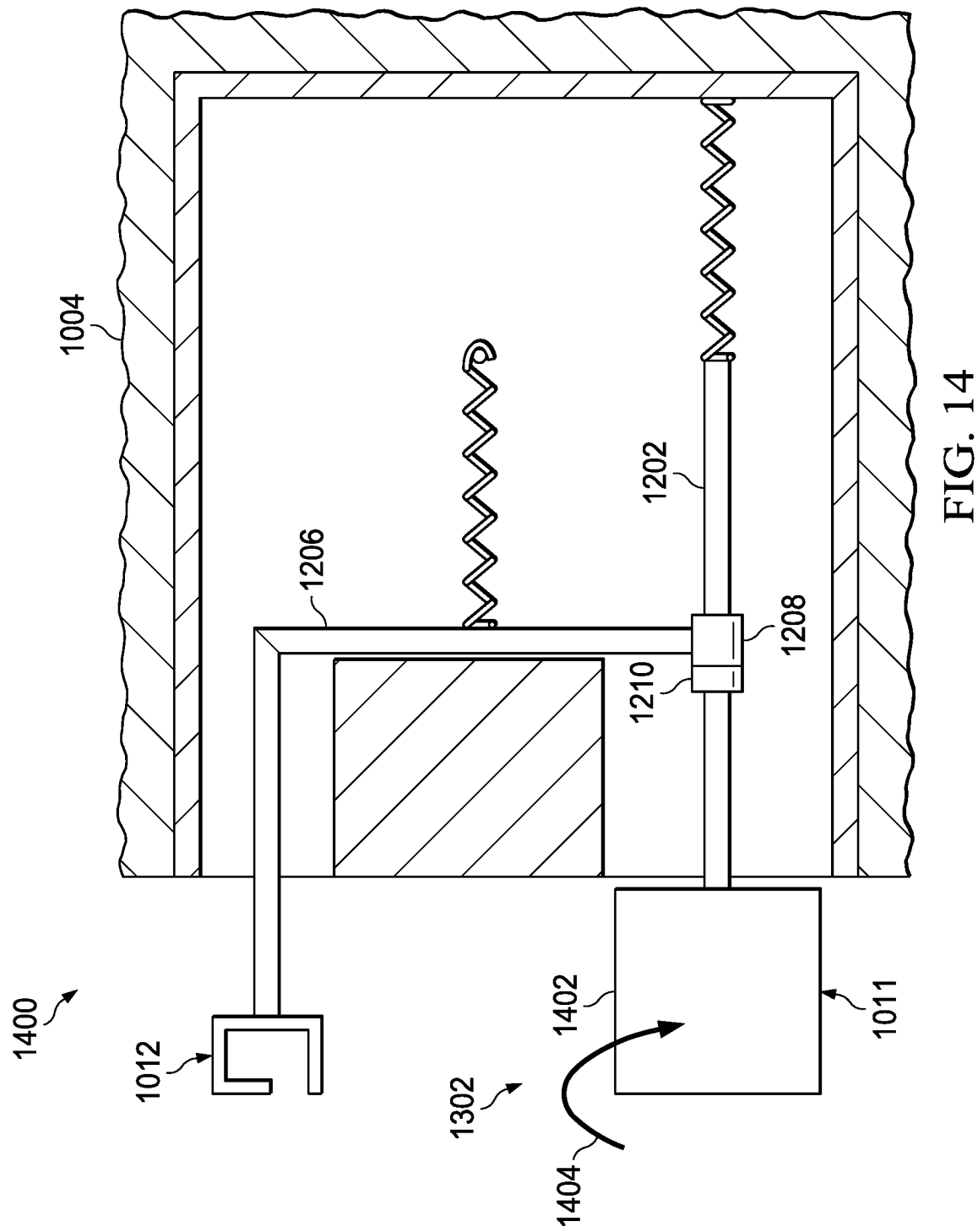
FIG. 14 is an illustration of a rotating retractable step system transitioning between a stowed position and a deployed position in accordance with an illustrative embodiment.

Turning now to FIG. 14, an illustration of a rotating retractable step system transitioning between a stowed position and a deployed position is depicted in accordance with an illustrative embodiment. In view 1400, a rotational force may be applied to edge 1402 of foot pedal 1011 to allow foot pedal 1011 to rotate to a horizontal position from vertical position 1302. During use, a user may apply rotational force to edge 1402 using their foot. In other illustrative examples, rather than applying a rotational force to edge 1402 of foot pedal 1011, a rotational force may be applied through support shaft 1202. In rotating from vertical position 1302 to a horizontal position, foot pedal 1011 may move in clockwise direction 1404.

Figure 15:
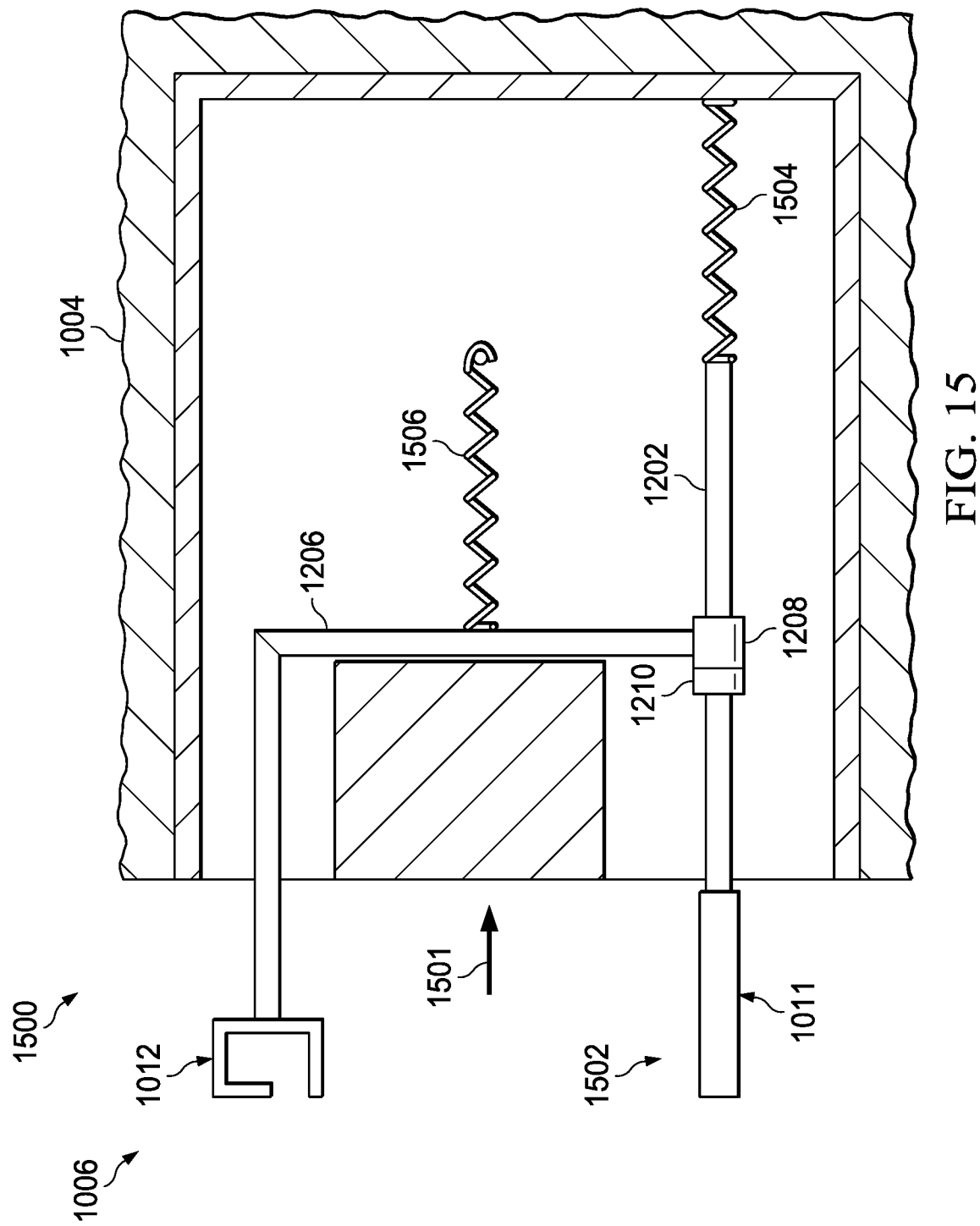
FIG. 15 is an illustration of a rotating retractable step system transitioning between a stowed position and a deployed position in accordance with an illustrative embodiment.

Turning now to FIG. 15, an illustration of a rotating retractable step system transitioning between a stowed position and a deployed position is depicted in accordance with an illustrative embodiment. In view 1500, grip 1012 has been released. After releasing grip 1012, grip 1012 and foot pedal 1011 will pull back into wall 1004, moving in direction 1501.

In view 1500, foot pedal 1011 is in horizontal position 1502. As foot pedal 1011 is pulled back by spring 1504, foot pedal 1011 remains in horizontal position 1502. Foot pedal 1011 will nest into the edge trim of wall 1004 and lock into horizontal position 1502. When foot pedal 1011 is locked into horizontal position 1502, foot pedal 1011 is in deployed position 1102. In view 1500, foot pedal 1011 is locked into position while grip 1012 is moving in direction 1501. Grip 1012 will be pulled in direction 1501 by spring 1506.

Figure 16:
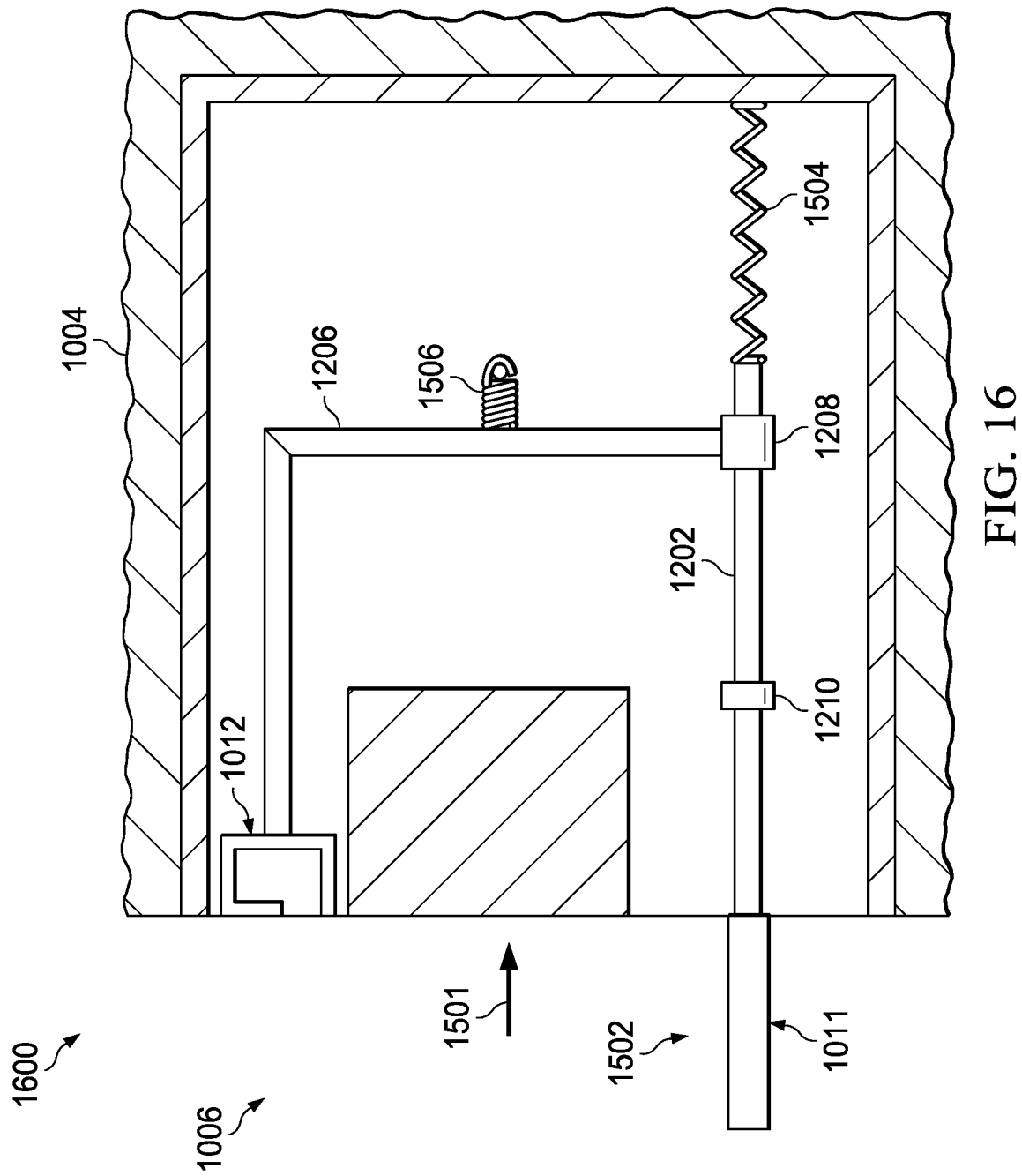
FIG. 16 is an illustration of a rotating retractable step system in a deployed position in accordance with an illustrative embodiment.

Turning now to FIG. 16, an illustration of a rotating retractable step system in a deployed position is depicted in accordance with an illustrative embodiment. In view 1600, grip 1012 has moved in direction 1501 and is within wall 1004. After foot pedal 1011 is locked into position it won't move any farther, but grip 1012 will continue to slide back due to its spring tension until it is fully nested. As depicted, grip 1012 is fully nested and rotating retractable step system 1006 is in deployed position 1102.

Figure 17:
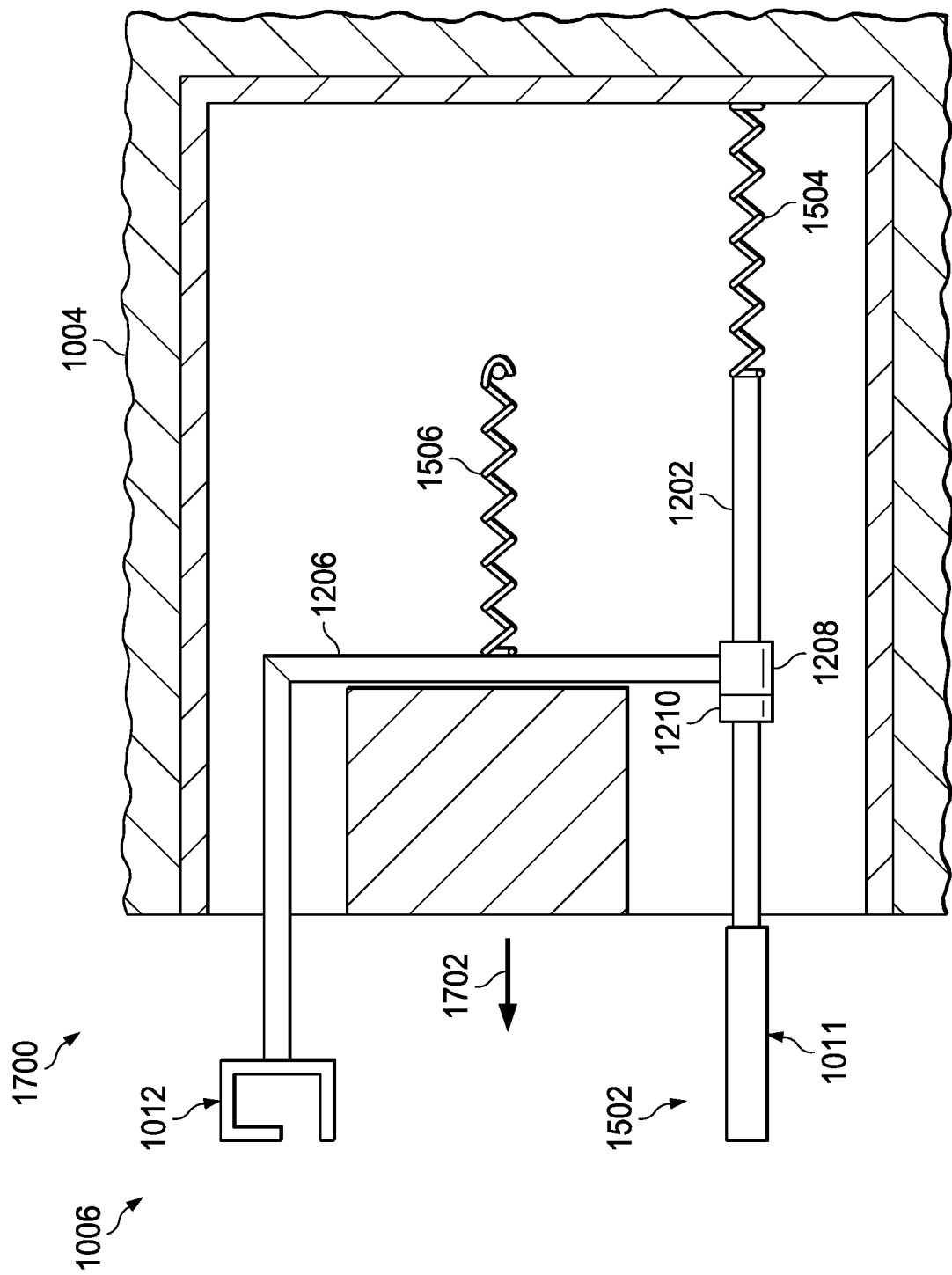
FIG. 17 is an illustration of a rotating retractable step system transitioning between a deployed position and a stowed position in accordance with an illustrative embodiment.

Turning now to FIG. 17, an illustration of a rotating retractable step system transitioning between a deployed position and a stowed position is depicted in accordance with an illustrative embodiment. In view 1700, grip 1012 is pulled in direction 1702 to remove foot pedal 1011 from the notches in wall 1004. Once foot pedal 1011 is removed from the notches of wall 1004, foot pedal 1011 is free to rotate from horizontal position 1502.

Pulling on grip 1012 causes grip 1012 to slide out until collar 1208 engages with collar 1210. Pulling grip 1012 farther, to its maximum length will allow foot pedal 1011 to come out of its position in the trim of wall 1004.

Figure 18:
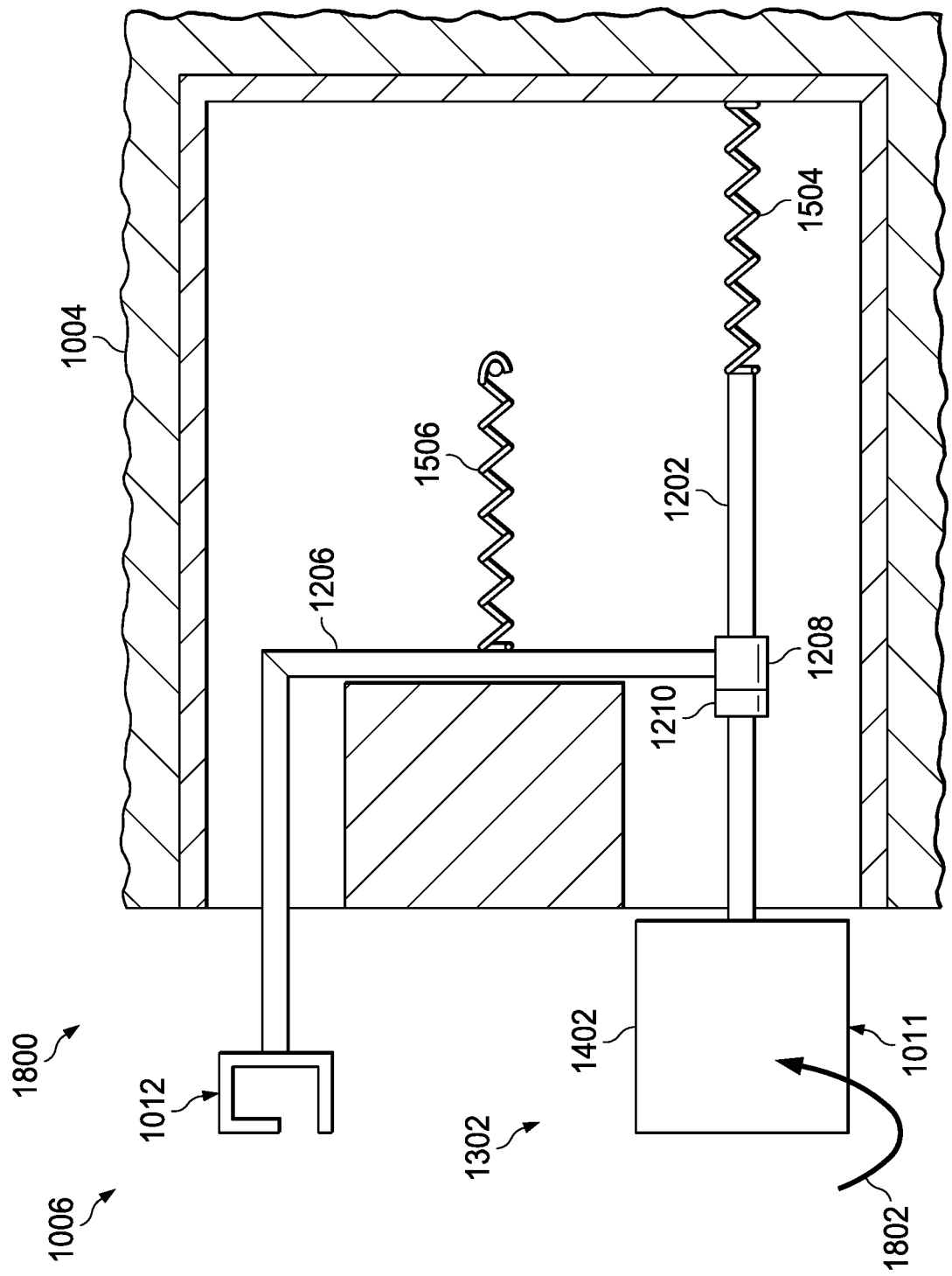
FIG. 18 is an illustration of a rotating retractable step system transitioning between a deployed position and a stowed position in accordance with an illustrative embodiment.

Turning now to FIG. 18, an illustration of a rotating retractable step system transitioning between a deployed position and a stowed position is depicted in accordance with an illustrative embodiment. In view 1800, a rotational force may be applied to edge 1402 of foot pedal 1011 to allow foot pedal 1011 to rotate to vertical position 1302 from horizontal position 1502 of FIG. 15. During use, a user may apply rotational force to edge 1402 using their foot. In other illustrative examples, rather than applying a rotational force to edge 1402 of foot pedal 1011, a rotational force may be applied through support shaft 1202. In rotating from horizontal position 1502 to vertical position 1302, foot pedal 1011 may move in counter-clockwise direction 1802.

Figure 19:
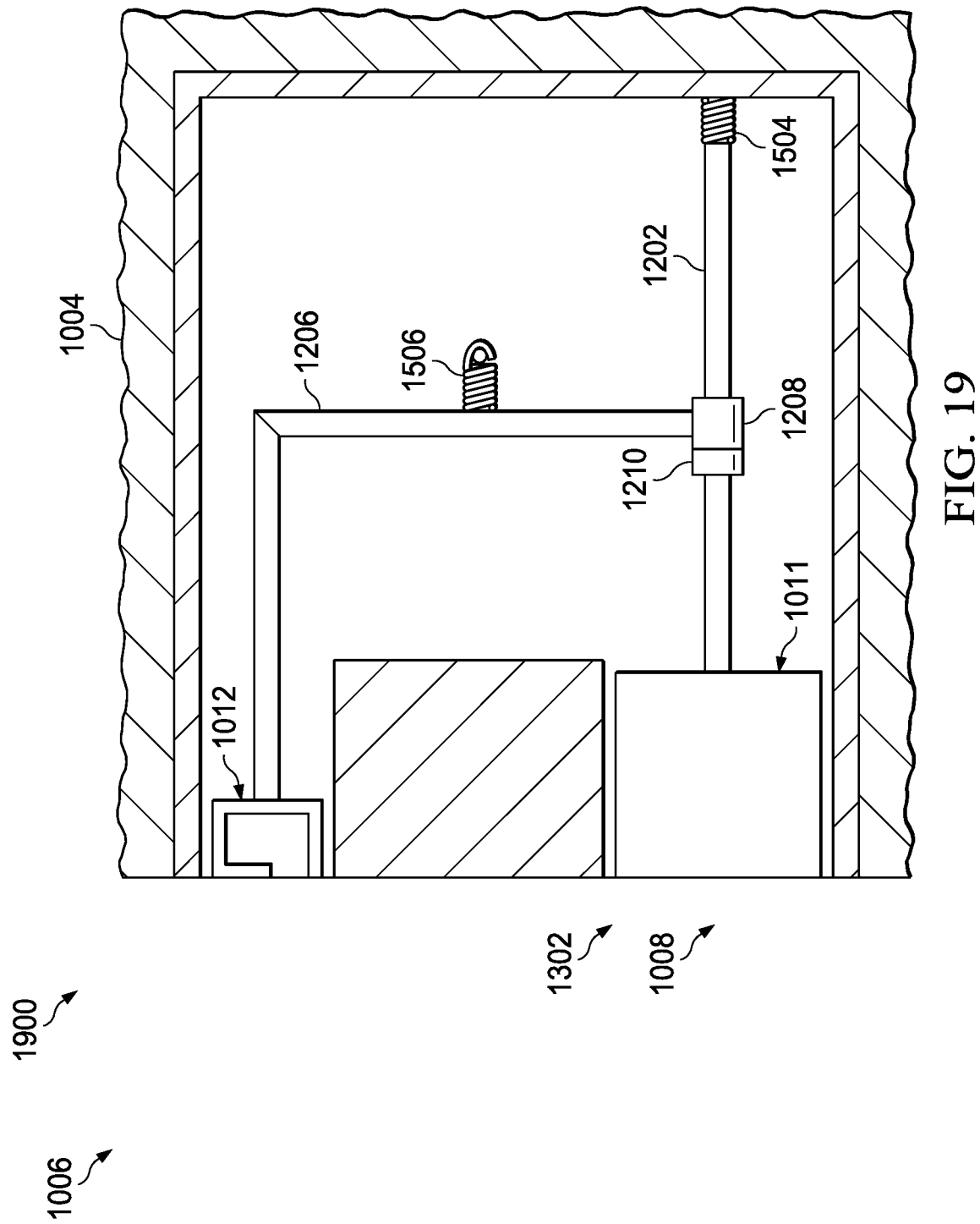
FIG. 19 is an illustration of a rotating retractable step system in a stowed position in accordance with an illustrative embodiment.

Turning now to FIG. 19, an illustration of a rotating retractable step system in a stowed position is depicted in accordance with an illustrative embodiment. In view 1900, rotating retractable step system 1006 is in stowed position 1008. Stowed position 1008 may also be referred to as a neutral position. In stowed position 1008, spring tension on foot pedal 1011 and spring tension on grip 1012 pull them into wall 1004 so they are flush with the edge of wall 1004. In some illustrative examples, wall 1004 is a panel in a galley. In these illustrative examples, foot pedal 1011 and grip 1012 are flush with the panel edge in the galley.

Figure 20:
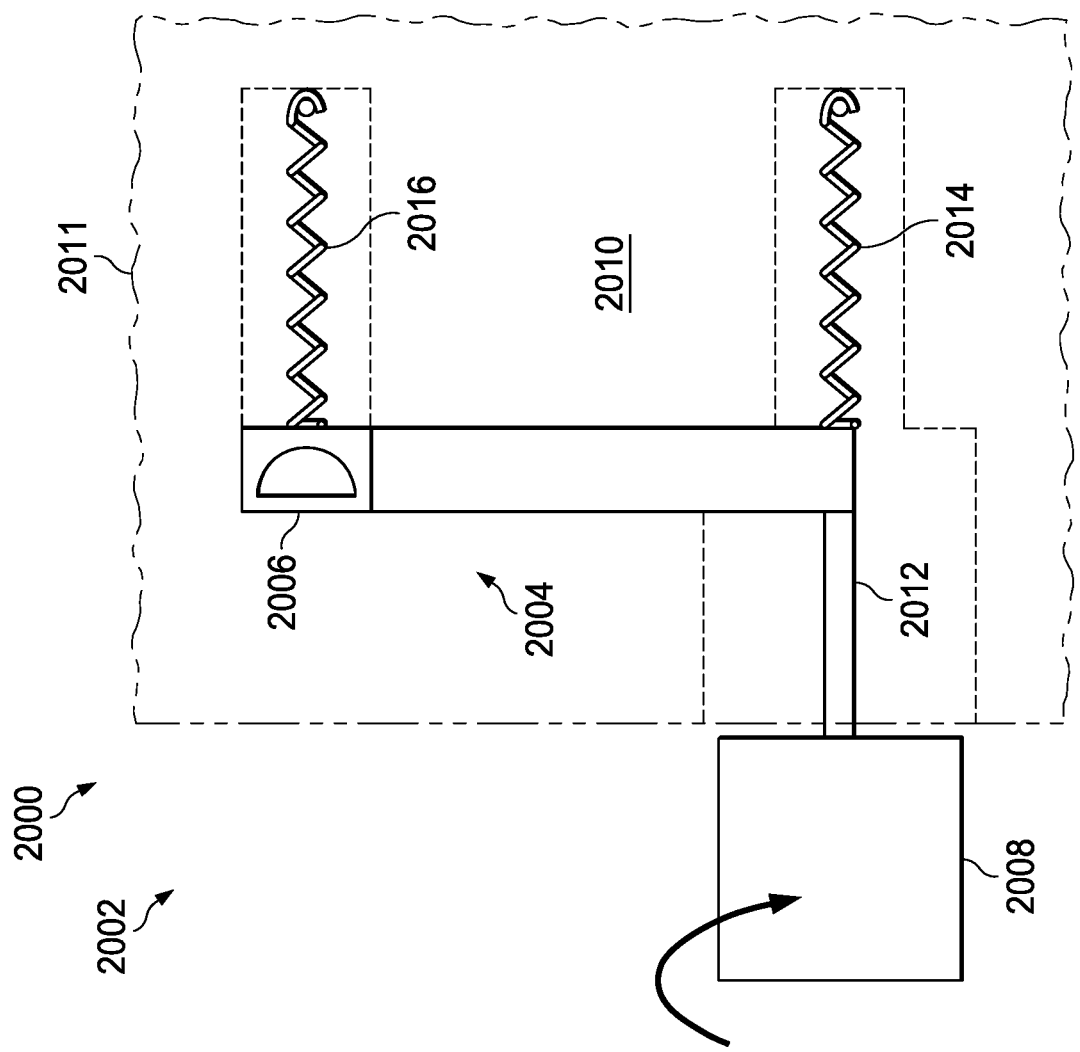
FIG. 20 is an illustration of a rotating retractable step system transitioning between a stowed position and a deployed position in accordance with an illustrative embodiment.

Turning now to FIG. 20, an illustration of a rotating retractable step system transitioning between a stowed position and a deployed position is depicted in accordance with an illustrative embodiment. In view 2000, rotating retractable step system 2002 is moving from a stowed position to a deployed position. In rotating retractable step system 2002, actuator 2004 takes the form of hand grip 2006. In this illustrative example, foot pedal 2008 is designed to be actuated via hand grip 2006 on the inside of compartment 2010. In view 2000, the face of wall 2011 is transparent so that movement system 2012 is visible. In this illustrative example, foot pedal 2008 is positioned outside of wall 2011 of compartment 2010. When foot pedal 2008 is stowed, foot pedal 2008 is within wall 2011 of compartment 2010. Hand grip 2006 is always within compartment 2010 but outside of wall 2011.

To deploy foot pedal 2008, an attendant would pull hand grip 2006 out to its maximum length which also pulls foot pedal 2008 out to its maximum length. As depicted, movement system 2012 comprises support shaft 2013 connecting hand grip 2006 to foot pedal 2008, spring 2014, and spring 2016. Hand grip 2006 is connected to foot pedal 2008 through support shaft 2013. When hand grip 2006 is moved a certain distance, foot pedal 2008 is moved the same distance.

Similar to rotating retractable step system 1006 of FIGS. 10-19, an attendant may apply a rotational force to the edge of foot pedal 2008 to rotate foot pedal 2008 to a horizontal position. To rotate foot pedal 2008 to a horizontal orientation, the user's foot may apply the rotational force on the edge of foot pedal 2008.

After releasing hand grip 2006, foot pedal 2008 would engage the edge profile of wall 2011 and lock into its horizontal position. To stow foot pedal 2008 of rotating retractable step system 2002, an attendant would pull hand grip 2006 out to its maximum length. The attendant may then rotate foot pedal 2008 to a vertical orientation by applying a rotational force on the edge of foot pedal 2008. Afterwards, releasing hand grip 2006 causes foot pedal 2008 to return all the way into wall 2011.

Figure 21:
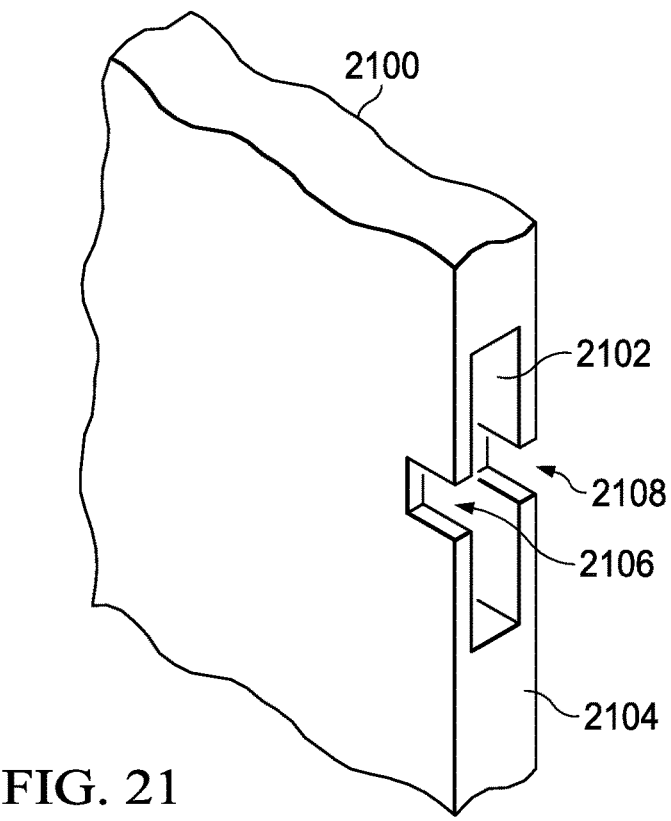
FIG. 21 is an illustration of a number of notches cut into a wall in accordance with an illustrative embodiment.

Turning now to FIG. 21, an illustration of a number of notches cut into a wall is depicted in accordance with an illustrative embodiment. Wall 2100 includes cutout 2102 in trim 2104. Trim 2104 of wall 2100 includes a metallic trim having cutout 2102 to allow a foot pedal sufficient room to nest into wall 2100.

Trim 2104 also has notch 2106 and notch 2108 taken out of the sides. Notch 2106 and notch 2108 provide space for the foot pedal to engage and lock into position to prevent rotation when horizontal.

Figure 22:
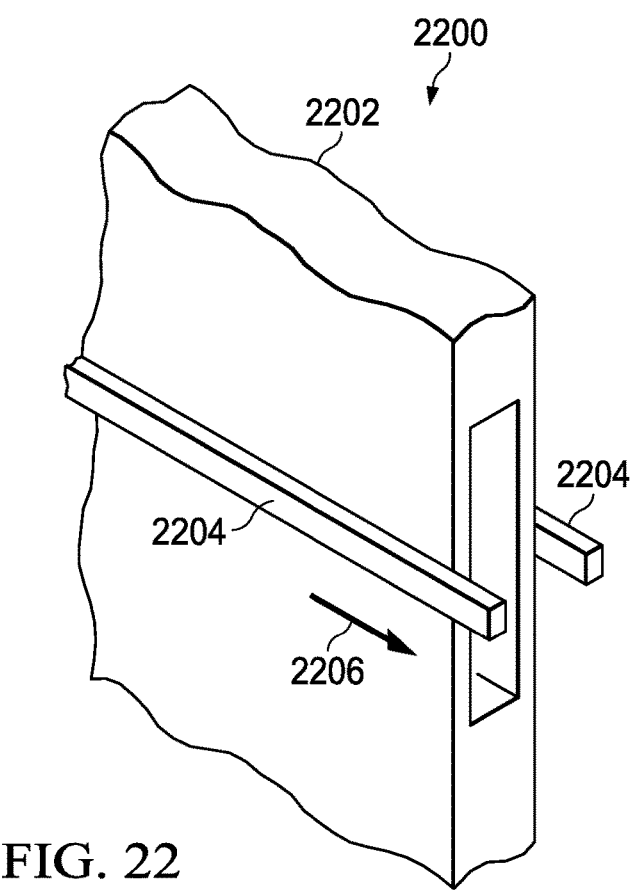
FIG. 22 is an illustration of a locking mechanism for a retractable rotating foot pedal in accordance with an illustrative embodiment.

Turning now to FIG. 22, an illustration of a locking mechanism for a retractable rotating foot pedal is depicted in accordance with an illustrative embodiment. In view 2200, rather than notches cut into wall 2202, extensions 2204 are associated with wall 2202. Extensions 2204 may provide support for a foot pedal when the foot pedal is in a horizontal position. Extensions 2204 may help sustain the weight of an attendant. Extensions 2204 may retract towards wall 2202 when not in use. Extensions 2204 may extend in direction 2206 when in use.

In some illustrative examples, the foot pedal may also lock onto extensions 2204 using associated locking mechanisms. By locking onto extensions 2204, extensions 2204 may also restrict rotation of the foot pedal. In other illustrative examples, rotation of the foot pedal may be restricted by a rotational lock associated with a support shaft.

The different components shown in FIG. 1 and FIGS. 3-22 may be combined with components in FIG. 2, used with components in FIG. 2, or a combination of the two. Additionally, some of the components in FIG. 1 and FIGS. 3-22 may be illustrative examples of how components shown in block form in FIG. 2 can be implemented as physical structures.

Turning now to FIG. 23, an illustration of a flowchart of a method for using a rotating retractable step system is depicted in accordance with an illustrative embodiment. Method 2300 may be performed to use rotating retractable step system 202 of FIG. 2. Method 2300 may be performed to use rotating retractable step system 406 of FIG. 4. Method 2300 may be performed to use rotating retractable step system 1006 of FIG. 10.

Method 2300 extends a foot pedal outwardly away from a stowed position within a cutout in a wall using a support shaft associated with the foot pedal, wherein the foot pedal is in a vertical orientation (operation 2302). Method 2300 rotates the foot pedal from the vertical orientation to a horizontal orientation (operation 2304). Afterwards the process terminates. In some illustrative examples, rotating the foot pedal from the vertical orientation to the horizontal orientation comprises rotating the foot pedal about an axis extending through the support shaft.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, method 2300 may further comprise restricting rotation of the foot pedal from the horizontal orientation using a locking mechanism. As another example, method 2300 may further comprise releasing the foot pedal from restriction by the locking mechanism to allow rotation of the foot pedal; rotating the foot pedal from the horizontal orientation to the vertical orientation; and retracting the foot pedal into the stowed position within the cutout in the wall using the support shaft. In yet a further example, method 2300 may further comprise indicating that the retractable step system is in a deployed position.

Illustrative embodiments of the disclosure may be described in the context of aircraft manufacturing and service method 2400 as shown in FIG. 24 and aircraft 2500 as shown in FIG. 25. Turning first to FIG. 24, an illustration of an aircraft manufacturing and service method is depicted in accordance with an illustrative embodiment. During pre-production, aircraft manufacturing and service method 2400 may include specification and design 2402 of aircraft 2500 in FIG. 25 and material procurement 2404.

During production, component and subassembly manufacturing 2406 and system integration 2408 of aircraft 2500 takes place. Thereafter, aircraft 2500 may go through certification and delivery 2410 in order to be placed in service 2412. While in service 2412 by a customer, aircraft 2500 is scheduled for routine maintenance and service 2414, which may include modification, reconfiguration, refurbishment, and other maintenance or service.

Each of the processes of aircraft manufacturing and service method 2400 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 25, an illustration of an aircraft is depicted in which an illustrative embodiment may be implemented. In this example, aircraft 2500 is produced by aircraft manufacturing and service method 2400 in FIG. 24 and may include airframe 2502 with plurality of systems 2504 and interior 2506. Examples of systems 2504 include one or more of propulsion system 2508, electrical system 2510, hydraulic system 2512, and environmental system 2514. Any number of other systems may be included.

Although an aerospace example is shown, different illustrative embodiments may be applied to other industries, such as the automotive industry.

Apparatuses and methods embodied herein may be employed during at least one of the stages of aircraft manufacturing and service method 2400 of FIG. 24. One or more illustrative embodiments may be used during component and subassembly manufacturing 2406. For example, rotating retractable step system 202 may be installed in aircraft 2500 during component and subassembly manufacturing 2406 of FIG. 24. Further, components of rotating retractable step system 202, such as tension spring 268, may be replaced using access panel 272 during maintenance and service 2414 of FIG. 24.

The illustrative embodiments provide a method and apparatus for a retractable rotatable step system. The illustrative embodiments address an operational need to provide elevated foot-steps within aircraft galleys to enable flight attendants to reach upper stowage compartments. Although various elevated foot-steps are in use today, the current designs do not sufficiently address ergonomic and safety requirements. The illustrative embodiments address the following key requirements: provide an elevated foot-step at a reachable height at a height sufficient to enable flight attendants to reach upper stowage compartments, of sufficient dimension to safely support a flight attendant's foot, that is retractable without protruding into the galley space when not in use, that is extendable when needed, and without creating hygiene concerns.

The illustrative examples recognize and take into account that for a conventional recessed footstep, the specifications may provide for a footstep that is 4 inches wide that supports the ball of the foot "which would typically permit the foot to be inserted a minimum of 3.5 inches." The illustrative examples further recognize that for safety reasons, it may be desirable to increase the surface area of the retractable foot step from 1.6 inches to at least 4 square inches. Additionally, the illustrative examples recognize and take into account that it would be desirable to increase the surface area of a retractable foot step which the ball of the foot can reside on from the conventional 0.3 square inches to almost 4 square inches.

The illustrative examples are designed to be to be stowed in a vertical orientation when not in use, making use of the narrow space between galley compartments, and rotated and locked into a horizontal orientation when it is in use.

The illustrative examples include a mechanism that enables a flight attendant to operate the elevated foot step without need to touch foot step surfaces with their hand, where the mechanism is configured to lock the foot step and support shaft within the support channel, with the foot step in a vertical orientation, to release the foot step and support shaft at the press of a button, to extend the released foot step and support shaft, outward a sufficient distance so that the foot step can be rotated to a horizontal orientation, to rotate the foot step to a horizontal orientation, when the force of the user's foot is applied laterally, to lock the foot step in the horizontal orientation, when the force of the user's foot is applied vertically, to rotate the foot step to a vertical orientation, when the force of the user's foot is removed, and the force of the users foot is applied laterally, to lock the foot step and support shaft within the support channel, with the foot step in a vertical position, when the force of a user's foot is applied longitudinally in the direction of the support shaft and support channel.

The illustrative examples present an elevated foot-step that can be fully recessed and mounted within the space between galley compartments or on the side of a galley cabinet as a single installable/replaceable unit comprising a foot step attached to a support shaft disposed within a support channel, mounted to a galley cabinet wall, or between galley compartments, where the foot step is rotated to a vertical orientation when retracted between the galley compartments and rotated to a horizontal orientation when extended out from between the galley compartments for use.

In practice, the support shaft and the support channel must be of sufficient strength, of sufficient length, and mounted with a sufficient bond, to support the weight of a user, with negligible risk of failure. The mechanism is configured to lock the foot step and spring tensioned support shaft within the support channel, with the foot step in a vertical orientation. The mechanism is configured to release the foot step and spring tensioned support shaft and to extend the released foot step and spring tensioned support shaft outward a sufficient distance so that the foot step can be rotated to a horizontal orientation, when pulled outward by a recessed, spring tensioned handle. The mechanism is configured to rotate the foot step to a horizontal orientation when the force of the user's foot is applied laterally. The mechanism is configured to retract the foot step, still in the horizontal orientation, to nest within an indentation in the support channel, thereby preventing the footstep from rotating during use. The mechanism is configured to retract the spring tensioned handle to its recessed position, when the spring tensioned handle is released by user. The mechanism is configured to release the footstep from its extended and horizontal position nested within an indentation in the support channel, when the user again pulls the recessed and spring tensioned handle. The mechanism is configured to rotate the foot step to a vertical orientation, when the force of the user's foot is applied laterally. The mechanism is configured to retract the foot step and spring tensioned support shaft and lock within the support channel, with the foot step in a vertical position, when the spring tensioned handle is released by the user.

In some illustrative examples, the mechanism comprises a finger grip; an actuator shaft, an actuator tension spring, and an actuator channel; a footstep; a support shaft, a support tension spring, and a support channel. In some illustrative examples, the finger grip is attached to the first end the actuator shaft. The actuation shaft may be slide-ably disposed within the actuator channel, with the finger grip extending from the actuation channel at a first end. The second end of the actuator shaft may be attached to a first end of an actuator tension spring disposed within the actuation channel. The second end of the actuator tension spring may be attached within the actuator channel to the second end of the actuation channel The footstep is rotationally attached to the first end of the support shaft. The support shaft is slideably disposed within the support channel, with the footstep extending from the support channel at a first end. The second end of the support shaft may be attached to a first end of a support tension spring disposed within the support channel. The second end of the support tension spring may be attached within the support channel to the second end the support channel The actuator shaft may be attached to the support shaft such that the support shaft can be extended when a user pulls the finger grip. When the footstep is locked in the extended and horizontal position, and the user releases the finger grip, the actuator shaft is retracted into the actuator channel by the actuator tension spring.

The elevated footstep is operated by, beginning with the finger grip, attached to the actuator shaft in a fully retracted position, and the foot step in a vertical orientation, attached to the support shaft in a fully retracted position, pulling on the finger grip and thereby and extending the footstep outward a sufficient distance so that the foot step can be rotated to a horizontal orientation. The foot step may be rotated to a horizontal orientation by applying a lateral force. The finger grip may be released, whereupon the spring tensioned finger grip attached to the actuator shaft returns to its fully retracted position, and the footstep retracts to nest within an indentation in the support channel, still in the horizontal orientation, thereby preventing the footstep from rotating during use, for use by the flight attendant.

The footstep may be moved from the deployed position by again, pulling on the finger grip and thereby extending the footstep outward a sufficient distance so that the foot step can be rotated to back to a vertical orientation. The foot step may be rotated to a vertical orientation by applying a lateral force. The finger grip may also be released, whereupon the finger grip, attached to the actuator shaft, returns to a fully retracted position, and the foot step in a vertical orientation, attached to the support shaft, returns to a fully retracted position.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A step system positioned within a wall, such that the step system comprises:
   an insert configured to fit within a cutout in the wall;
   a first tension spring attached to:
      an interior of the insert; and
      a first end of a shaft;
   a second end of the shaft rotatably connected to a foot pedal, such that with the foot pedal in a stowed position a step surface of the foot pedal rests within and parallel to a face of the wall;
   a grip connected to linkage bars that connect to:
      a first end of a second tension spring anchored, at a second end of the second tension spring, within the insert; and
      a first collar that encircles the shaft such that:
         the shaft translates within the first collar; and
         in the stowed position, a trim surface of the grip remains flush with a trim surface of the wall;
   a second collar anchored onto the shaft and aligned with the first collar; and
   a locking mechanism configured to retain the foot pedal outside of the wall with the step surface perpendicular to the face of the wall in a deployed position.

2. The step system of claim 1, further comprising the foot pedal configured to:
   be actuated manually by the grip; and
   be rotated by application of a rotational force to the foot pedal, such that rotatably connected comprises a configuration for a rotation of the step surface from parallel to the face of the wall when within the wall to perpendicular to the wall when extended outside of the wall.

3. The step system of claim 1, wherein the grip is configured to return into a recess in the wall upon releasing the grip with the foot pedal in the deployed position.

4. The step system of claim 1, wherein a trim surface of the foot pedal and the step surface are substantially perpendicular to each other and share a common edge.

5. The step system of claim 1 further comprising:
   the first tension spring attached to:
      the interior of the insert at a first end of the first tension spring;
      the first end of a shaft at a second end of the first tension spring;
      the second end of the shaft rotatably connected to the foot pedal on a side of the foot pedal opposite a trim surface of the foot pedal;
      the grip connected, on a side of the grip opposite the trim surface of the grip, to a first end of a first linkage bar that extends, parallel to the shaft, into the wall and connects, at a second end of the first linkage bar, to a second linkage bar that connects to the first end of the second tension spring and the first collar; and
      the second collar anchored onto the shaft such that a deployment of the grip out of the wall translates the first collar into contact with the second collar such that the side of the foot pedal opposite the trim surface of the foot pedal extends out beyond the trim surface of the wall.

6. The step system of claim 1, wherein the step surface comprises a surface area of at least 3.5 square inches.

7. The step system of claim 1, wherein the step surface of the foot pedal remains outside of the cutout and substantially parallel to a floor adjacent to the wall when in the deployed position, and wherein the step surface of the foot pedal remains within the cutout and substantially perpendicular to the floor when the foot pedal is in the stowed position.

8. The step system of claim 1, further comprising the locking mechanism comprising the first tension spring configured to retract the foot pedal into a notch in the face of the wall, such that a height of the notch exceeds a thickness of the foot pedal.

9. The step system of claim 1, wherein the foot pedal is configured to rotate about an axis that extends through the shaft.

10. The step system of claim 1 further comprising:
    an electrical actuator configured to receive a user input to initiate movement of the shaft.

11. The step system of claim 1 further comprising:
    an indicator configured to indicate the deployed position;
    the first tension spring configured to keep the foot pedal within the wall in the stowed position; and
    the second tension spring configured to keep the grip within the wall in the stowed position.

12. The step system of claim 11, wherein the indicator is selected from a light, a color, or an audible signal.

13. A step system configured to transition between a stowed position and a deployed position, such that the step system that comprises:
    an insert configured to fit within a cutout in a wall;
    a first tension spring attached to:
       an interior of the insert at a first end of the first tension spring; and
       to a first end of a shaft at a second end of the first tension spring;
    a second end of the shaft rotatably connected to a foot pedal on a side of the foot pedal opposite a trim surface of the foot pedal, such that with the foot pedal in a stowed position, and a step surface of the foot pedal rests within and parallel to a face of the wall;

a grip connected, on a side of the grip opposite a trim surface of the grip, to a first end of a first linkage bar that extends, parallel to the shaft, into the wall and connects, at a second end of the first linkage bar, to a second linkage bar that connects to:
- a first end of a second tension spring anchored, at a second end of the second tension spring, within the insert; and
- a first collar that encircles the shaft such that:
  - the shaft translates within the first collar; and
  - in the stowed position, the trim surface of the grip remains flush with the trim surface of the wall;
- a second collar anchored onto the shaft such that a deployment of the grip out of the wall translates the first collar into contact with the second collar such that the side of the foot pedal opposite the trim surface of the foot pedal extends out beyond a trim surface of the wall;
- a locking mechanism configured to the foot pedal outside of the wall with the step surface perpendicular to the face of the wall in the deployed position; and
- an actuator configured to initiate a movement of the foot pedal, such that the actuator comprises the grip.

14. The step system of claim 13, wherein the foot pedal is configured to rotate about a centerline that extends through the foot pedal, such that rotatably connected comprises a configuration for a rotation of the step surface from parallel to the face of the wall when within the wall to perpendicular to the wall when extended outside of the wall.

15. The step system of claim 13, wherein the trim surface of the foot pedal remains flush with the trim surface of the wall when the step system is in the stowed position.

16. The step system of claim 15, wherein the trim surface of the foot pedal and the step surface are substantially perpendicular to each other and share a common edge.

17. A method for providing a step pedal on a wall, the method comprising:
- extending a foot pedal outwardly away from a stowed position within a cutout in the wall via extending, via pulling a grip in an insert in the wall out of the insert, a shaft away from the insert in the wall via contacting a collar on the shaft with a collar on an end of linkage bars inside the insert, the shaft being associated with the foot pedal and connected, via the collar on the end of the linkage bars translating along the shaft, the linkage bars being connected, at an end of the linkage bars opposite the end of the linkage bars connected to the collar, to a side of the grip opposite a trim surface of the grip, such that a step surface of the foot pedal remains in a vertical orientation in the stowed position;
- rotating the foot pedal from the vertical orientation to a horizontal orientation;
- restricting a rotation of the foot pedal from the horizontal orientation using a locking mechanism comprising a number of notches in a face of the wall; and
- locking the foot pedal against the rotation via inserting the foot pedal into notches in the face of the wall.

18. The method of claim 17, further comprising:
- releasing the foot pedal from a restriction by the locking mechanism to allow the rotation of the foot pedal;
- rotating the foot pedal from the horizontal orientation to the vertical orientation; and
- retracting the foot pedal into the stowed position within the cutout in the wall using the shaft.

19. The method of claim 17 further comprising:
indicating that the foot pedal is in a deployed position.

20. The method of claim 17, wherein rotating the foot pedal from the vertical orientation to the horizontal orientation comprises rotating the foot pedal about an axis extending through the shaft.

* * * * *